(12) United States Patent
Babu et al.

(10) Patent No.: US 11,720,813 B2
(45) Date of Patent: Aug. 8, 2023

(54) MACHINE LEARNING PLATFORM FOR DYNAMIC MODEL SELECTION

(71) Applicant: Oracle International Corporation, Redwood Shores, CA (US)

(72) Inventors: Shashi Anand Babu, Foster City, CA (US); Raghuram Venkatasubramanian, Cupertino, CA (US); Neel Madhav, Palo Alto, CA (US); Herve Mazoyer, Oakland, CA (US); Daren Race, Alameda, CA (US); Arun Kumar Kalyaana Sundaram, Milpitas, CA (US); Lasya Priya Thilagar, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1241 days.

(21) Appl. No.: 16/147,255

(22) Filed: Sep. 28, 2018

(65) Prior Publication Data

US 2019/0102700 A1    Apr. 4, 2019

Related U.S. Application Data

(60) Provisional application No. 62/568,052, filed on Oct. 4, 2017.

(30) Foreign Application Priority Data

Sep. 29, 2017   (EP) .................................... 17306308

(51) Int. Cl.
   *G06N 20/00*   (2019.01)
   *G06N 5/04*    (2023.01)
   *G06N 5/046*   (2023.01)

(52) U.S. Cl.
   CPC ............. *G06N 20/00* (2019.01); *G06N 5/046* (2013.01)

(58) Field of Classification Search
   CPC .............................. G06N 20/00; G06N 5/046
   See application file for complete search history.

(56) References Cited

U.S. PATENT DOCUMENTS

| | | | |
|---|---|---|---|
| 8,595,154 B2 * | 11/2013 | Breckenridge | G06N 20/00 706/12 |
| 10,318,552 B2 * | 6/2019 | Baughman | G06F 16/285 |
| 10,380,498 B1 * | 8/2019 | Chaoji | G06N 7/005 |

OTHER PUBLICATIONS

Abulfazl Ahmadi, "Fuzzy Modification of Mixture of Experts", 2011 (Year: 2011).*

(Continued)

*Primary Examiner* — Ann J Lo
*Assistant Examiner* — Van C Mang
(74) *Attorney, Agent, or Firm* — Kilpatrick Townsend & Stockton LLP

(57) ABSTRACT

The present disclosure relates generally to an integrated machine learning platform. The machine learning platform can convert machine learning models with different schemas into machine learning models that share a common schema, organize the machine learning models into model groups based on certain criteria, and perform pre-deployment evaluation of the machine learning models. The machine learning models in a model group can be evaluated or used individually or as a group. The machine learning platform can be used to deploy a model group and a selector in a production environment, and the selector may learn to dynamically select the model(s) from the model group in the production environment in different contexts or for different input data, based on a score determined using certain scoring metrics, such as certain business goals.

20 Claims, 18 Drawing Sheets

(56) References Cited

OTHER PUBLICATIONS

Rafael Cruz, "Dynamic classifier selection: Recent advances and perspectives", (Year: 2017).*
Maxime Oquab, "Learning and Transferring Mid-Level Image Representations using Convolutional Neural Networks" (Year: 2014).*

* cited by examiner

MACHINE LEARNING PLATFORM FOR DYNAMIC MODEL SELECTION

CROSS-REFERENCE TO RELATED APPLICATIONS

The present application claims the benefit of and priority to European Patent Application No. 17306308.2, filed on Sep. 29, 2017, entitled "Machine Learning Platform," and U.S. Provisional Patent Application No. 62/568,052, filed on Oct. 4, 2017, entitled "Machine Learning Platform," which are herein incorporated by reference in their entireties for all purposes.

BACKGROUND

Machine learning has a wide range of applications, such as search engines, medical diagnosis, text and handwriting recognition, image processing and recognition, load forecasting, marketing and sales diagnosis, chatbot, autonomous driving, and the like. Various types and versions of machine learning models may be generated for similar applications using training data based on different technologies, languages, libraries, and the like, and thus may lack interoperability. In addition, different models may have different performances in different contexts and/or for different types of input data.

BRIEF SUMMARY

The present disclosure relates generally to an integrated machine learning platform. Techniques are disclosed for facilitating machine learning model import/export, removal, storage, searching, verification, evaluation, selection, update, production deployment, user test, scoring, and the like, using the integrated machine learning platform. Such techniques may be implemented as a computer-based system, which can be implemented in an enterprise computing system or cloud computing system. The computer system may be implemented as a cloud-based service. Various inventive embodiments are described herein, including methods, systems, non-transitory computer-readable storage media storing programs, code, or instructions executable by one or more processors, and the like.

According to some embodiments, the machine learning platform may facilitate management of various machine learning models and data associated with the machine learning models. For example, the machine learning platform may use several techniques to convert machine learning models with different schemas into machine learning models that share a common schema, such that these machine learning models created based on different technologies, languages, libraries, and the like, and having different representation data structure (e.g., feature vectors) may be used for a same application. In some embodiments, the machine learning platform may also perform pre-deployment evaluation of the machine learning models.

In some embodiments, the machine learning platform may organize the machine learning models into model groups based on certain criteria. The machine learning models in a model group may be evaluated individually or as a group. For example, in some cases, a model may be selected randomly from a model group and the score of the randomly selected model may be used as the score for the model group. In some embodiments, a trainable selector may be used to select one or more models from the model group and/or select a strategy (or scheme) for combining the one or more models, such as distributing the input data to different models, using a weighted sum of results from multiple models, or using a voting mechanism to select the most common results. The selected one or more models and the combining strategy may be evaluated to determine a score for the model group based on, for example, some business rules or key performance indicators (KPI). The selector may be improved based on the score of the one or more models and strategy selected by the selector.

In some embodiments, the machine learning platform may be used to deploy a model group and a selector in a production environment, and the selector may learn to dynamically select the model(s) from the model group in the production environment in different contexts or for different input data based on a score determined using certain scoring metrics, such as certain business goals. In this way, the models in a model group may be dynamically selected and used in the production environments, and the selector may be trained to adaptively select the appropriated models in the production environments.

According to certain embodiments, a method may include, by a computer system, selecting a model group and a model selector for the model group, analyzing input data using the model group and the model selector, determining, during the analyzing, a score for the model group and the model selector based on the analyzing and a set of scoring metrics, and updating, during the analyzing, the model selector or the model group based upon determining that the score is below a threshold value. The model group may include one or more machine learning (ML) models, where each ML model in the model group may be configured to perform a same function. The model selector may be configured to dynamically select, based on a set of rules or a trainable selection model, at least one ML model from the model group for data analysis.

In some embodiments, the one or more ML models in the model group may have a common ML model schema. The one or more ML models in the model group may include different versions of a machine learning model. The set of scoring metrics may include a business goal.

In some embodiments, the set of rules may include a rule for selecting the at least one model based on attributes of the input data. Updating the model selector may include adding a new rule to the set of rules, revising a rule in the set of rules, or revising the trainable selection model. In some embodiments, updating the model group may include retraining a first ML model in the model group based on the analyzing and the score, and adding the retrained first ML model to the model group.

In some embodiments, the input data may include real-time input data from a production environment. In some embodiments, the input data may include contextual data of the production environment. Analyzing the input data using the model group and the model selector may include analyzing a first portion of the input data using a first ML model in the model group, and analyzing a second portion of the input data using a second ML model in the model group. Analyzing the input data using the model group and the model selector further may include analyzing a third portion of the input data using a third ML model in the model group.

In some embodiments, the model selector may be further configured to determine a scheme for using the selected at least one ML model to analyze the input data. The scheme for using the selected at least one ML model to analyze the input data may include analyzing a same portion of the input data by each of the selected at least one ML model, and selecting, from results of analyzing the same portion of the input data by the selected at least one ML model, a most common result as a result for the portion of the input data.

In some embodiments, the method may also include reporting usage of the one or more ML models in the model group for the analyzing. In some embodiments, the method may include receiving a plurality of ML models, selecting the one or more ML models from the plurality of ML models, determining a common schema for the one or more ML models, converting a first ML model having a schema different from the common schema based on the common schema, and adding the converted first ML model to the model group. Determining the common schema for the one or more ML models may include determining the common schema that is a union of schemas for the one or more ML models, adding one of two congruent features in two respective schemas for two ML models to the common schema, or dropping a feature in a schema for a second ML model based on determining that the feature has an importance level below a second threshold value.

According to certain embodiments, a non-transitory computer readable medium may store a plurality of instructions executable by one or more processors. The plurality of instructions, when executed by the one or more processors, may cause the one or more processors to perform processing including selecting a model group and a model selector for the model group, analyzing input data using the model group and the model selector, determining, during the analyzing, a score for the model group and the model selector based on the analyzing and a set of scoring metrics, and updating, during the analyzing, the model selector or the model group based upon determining that the score is below a threshold value. The model group may include one or more machine learning (ML) models, where each ML model in the model group may be configured to perform a same function. The model selector may be configured to dynamically select, based on a set of rules or a trainable selection model, at least one ML model from the model group for data analysis.

According to certain embodiments, a system may include one or more processors and a memory coupled to the one or more processors and storing instructions. The instructions, when executed by the one or more processors, may cause the system to select a model group and a model selector for the model group, analyze input data using the model group and the model selector, determine, during the analyzing, a score for the model group and the model selector based on the analyzing and a set of scoring metrics, and update, during the analyzing, the model selector or the model group based upon determining that the score is below a threshold value. The model group may include one or more machine learning (ML) models, where each ML model in the model group may be configured to perform a same function. The model selector may be configured to dynamically select, based on a set of rules or a trainable selection model, at least one ML model from the model group for data analysis.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and embodiments will become more apparent upon referring to the following specification, claims, and accompanying drawings.

BRIEF DESCRIPTION OF THE DRAWINGS

Illustrative examples are described in detail below with reference to the following figures.

FIG. 8 illustrates an example machine learning model according to certain embodiments.

FIG. 10 illustrates example code for creating an example model group and an example selector entity for an example machine learning model on an example machine learning platform according to certain embodiments.

FIG. 13 illustrates example code for implementing a strategy for combining multiple machine learning models using a selector on an example machine learning platform according to certain embodiments.

FIG. 14 illustrates an example of traffic splitting according to the combining strategy selected by a selector on an example machine learning platform according to certain embodiments.

DETAILED DESCRIPTION

Figure 1:
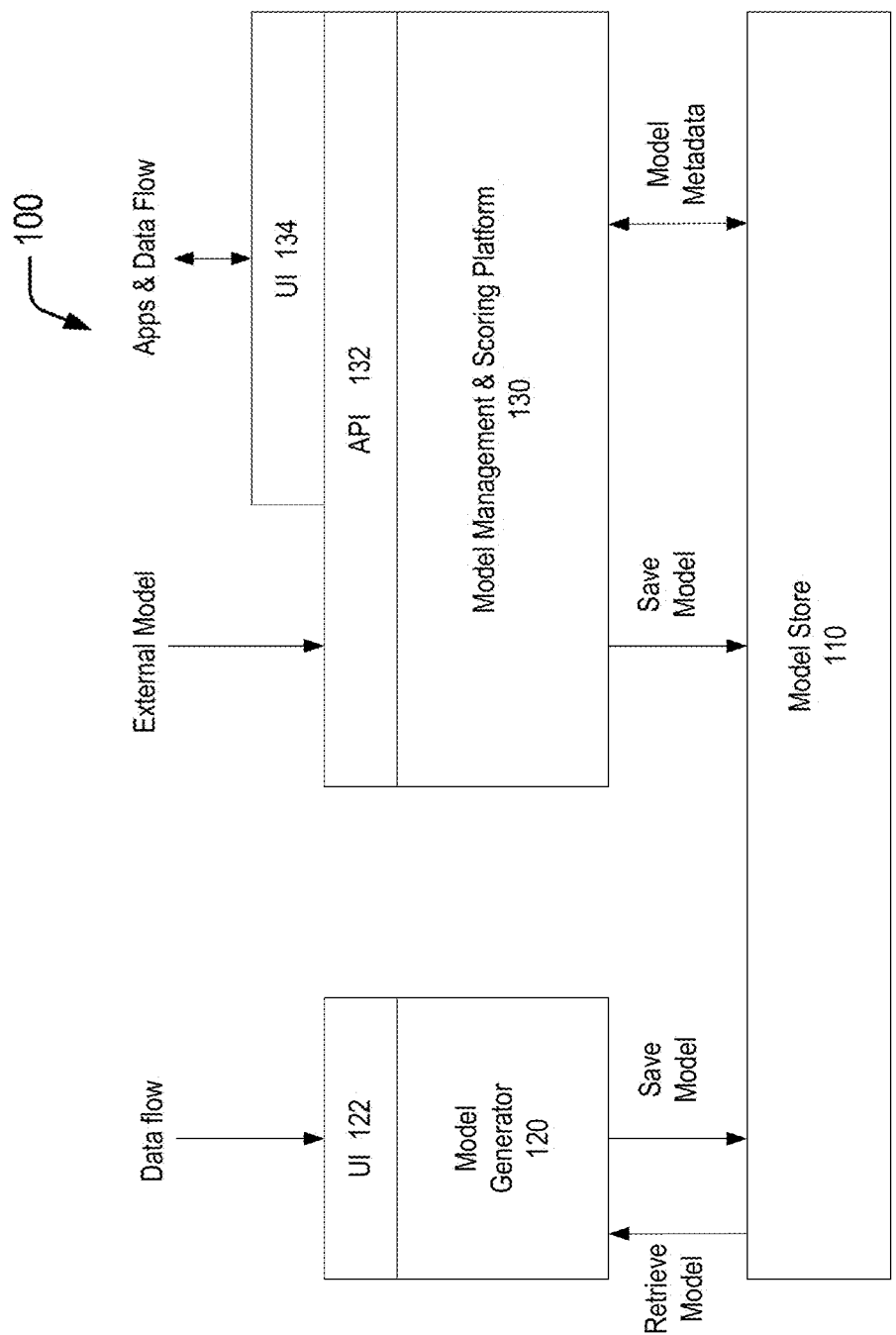
FIG. 1 illustrates a simplified block diagram of an example machine learning platform according to certain embodiments.

The present disclosure relates generally to an integrated machine learning (ML) platform. Techniques are disclosed for facilitating machine learning model import/export, removal, storage, searching, comparison, verification, evaluation, selection, update, production deployment, user test, scoring, and the like, using the integrated machine learning platform. Such techniques may be implemented as a computer-based system, which can be implemented in an enterprise computing system or cloud computing system. The computer system may be implemented as a cloud-based service. Various inventive embodiments are described herein, including methods, systems, non-transitory computer-readable storage media storing programs, code, or instructions executable by one or more processors, and the like.

Various types and versions of machine learning models may be generated for similar or different applications. These models may be based on different architectures, technologies, languages, libraries, and the like, and may have different representation data structure (e.g., feature vectors). As such, these models may have different schemas and lack interoperability. In addition, different models or versions of models may have different performances in different contexts and/or for different types of input data. In some cases, the available models may be pre-evaluated before deployment or evaluated in production (e.g., using a small portion of input data as in AB testing), and a best performing model may be selected based on the evaluation results. However, in some cases, for a single application, there may not be a single machine learning model that can work the best in all environments and for all data. In other words, a single model may not be able to adapt to the different environments and input data. Thus, the process of evaluation and selection of models offline may not keep pace with the change of the contexts and input data.

According to some embodiments, the machine learning platform may facilitate management of various machine learning models and other data associated with the machine learning models (e.g., scores for different contexts, user feedback, statistics regarding the usage of the models, and the like). For example, the machine learning platform may use several techniques to convert machine learning models with different schemas into machine learning models that share a common schema, such that these machine learning models created based on different technologies, languages, libraries, and the like, and having different representation data structure (e.g., feature vectors) may be used for a same application. In this way, different models may be used for a same application interchangeably or in combination. In addition, the integrated machine learning platform may allow for storing, searching, selecting, tracking, grouping, evaluating, and updating the different models on a same platform.

In some embodiments, the machine learning platform may organize the machine learning models into model groups based on certain criteria. The machine learning models in a model group may be evaluated individually or as a group. For example, in some cases, a model may be selected randomly from a model group and the score of the randomly selected model may be used as the score for the model group. In some embodiments, a trainable selector may be used to select one or more models from the model group and/or select a strategy (or scheme) for combining the one or more models, such as distributing the input data to different models, using a weighted sum of results from multiple models, or using a voting mechanism to select the most common results. The selected one or more models and the combining strategy may be evaluated to determine a score for the model group based on, for example, some business rules or key performance indicators (KPI). The selector may be improved (e.g., learn new or improved rules) based on the score of the one or more models and strategy selected by the selector. As such, two or more ML models, rather than a single ML model, may be used as a group or a combined model and may be dynamically selected by a selector according to certain rules or goals for an application.

In some embodiments, the machine learning platform may be used to deploy a model group and a selector in a production environment, and the selector may learn to dynamically select the model(s) from the model group in the production environment in different contexts or for different input data based on a score determined using certain scoring metrics, such as certain business goals. In this way, the models in a model group may be dynamically selected and used in the production environments, and the selector may be trained to adaptively select the appropriated models in the production environments. By training the selector in the production environment to dynamically select a model or a combination of different models from a model group (and/or a strategy for combining the models), the model group and the selector may achieve the optimum results in any context and for any input data.

As used herein, model training may refer to training machine learning models in data flows. As used herein, a model may refer to a machine learning-based model or other models (e.g., analytical models or rules) that can be used to analyze data, such as making inferences or predictions based on the data. A user may create a data flow to train a model and execute the data flow to create the model. The data flow may include all preparation steps to prepare data for training a model.

As used herein, model management may involve managing the lifecycle of models, versioning models, evaluating models, comparing versions of a model, deploying models for scoring, and updating models based on feedback.

As used herein, several models having a same name/identification may be different versions of a model. The different versions of a model may be considered different models for the purpose of model grouping and model selection. The different versions of a model might differ in their hyper-parameters or other parameters, and may be trained using different training data. The different versions may be evaluated against various test datasets to identify one or more of them to deploy in a production environment.

As used herein, a production environment may refer to an environment where a machine learning model may be applied to real time user input data, rather than training data or test data with known expected results. Input data in the production environment may be referred to as online data, in contrast to the offline training or test data.

As used herein, scoring using a model may involve generating predictions for given data using the model. The predictions can be categorical predictions or numeric values based on the type (classification vs. regression) of the model. In some cases, the scoring may be based on scoring metrics that may include some business goals or key performance indicators, such as how long customers stay on a website or how often customers visiting a website purchase an item or service at the end. The scoring may be for a specific model, a group of models (which may be referred to as a model group), a selector that selects models from a model group, or a combination of the model group and the selector.

As used herein, a model group may include a set of ML models that can be used to extract features and infer additional information from input data, such as classifying objects, predicting future events, or determining preventive actions, and the like. Models can be added to or removed from a model group. Data can be used for scoring a model group. A group can be used as an abstraction of one or more models. For instance, a model group may initially include a single model M1 for an application. When a new model M2 is created later to replace M1 as in periodically refreshing models, the application may seamlessly transition to using the new model M2 without knowing the underlying change.

As used herein, a selector may be an entity that can select one or more models from a model group based on input data that may include transaction data and/or contextual data. A selector may use a set of rules and scoring metrics to select the one or more models. In some embodiments, a selector may select a model from a model group randomly, sequentially (in a round robin fashion), based on a frequency for each model (e.g., using model A 60% of the time, model B 30% of the time, and model C 10% of the time), or based on certain attributes of the input data. The selector may also select a scheme for combining different models, such as using a weighted sum of the results of multiple models or selecting a most common result from the results of multiple models. In some embodiments, the selector may be trained in the production environment based on some scoring metrics to dynamically select the optimum combination of models and/or the combining scheme.

In the following description, for the purposes of explanation, specific details are set forth in order to provide a thorough understanding of examples of the disclosure. However, it will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

In general, machine learning techniques can be used to construct a prediction model that extracts useful knowledge (e.g., feature vectors) from training data, and uses it to make inferences about future data. Existing machine learning techniques can be categorized by the intended structure of the model. Most machine learning techniques fall into the categories of supervised, unsupervised, and reinforcement learning. In supervised learning, machine learning techniques are provided with a labeled training data set. The labeled training data set is used to build the system model representing the learned relation between the input, output, and system parameters. In contrast to supervised learning, unsupervised learning techniques are not provided with labels (i.e., there is no output vector). The goal of an unsupervised learning technique may include, for example, classifying the sample sets into different groups or clusters by investigating the similarity between the input samples. In reinforcement learning techniques, the system may learn by interacting with its environment. Some machine learning techniques may share characteristics of both supervised and unsupervised learning methods. These hybrid techniques (often termed as semi-supervised learning) aim to inherit the strengths of these main categories, while minimizing their weaknesses.

In some cases, a machine learning may be formulated as an optimization problem: given a set of training data X, find a model W that minimizes the error of a prediction function F(X,W). Generally, a machine learning technique approaches this problem iteratively, starting from a random model or a prior model W and refining its solution gradually as more and more data is processed. Thus, the machine learning model generated through learning depends heavily on the data used for training. New models or new versions of models may be generated when new training data has been used.

There may be a few challenges associated with model deployment in real-world applications. For example, heterogeneous and changing technologies may be adopted by developers of machine learning models, such as data scientists. The developer may commonly adopt leading edge technologies, languages, and libraries, and may have the freedom to do so within their own, often self-managed, environments or development platforms. This may result in ML models that may use a disparate and rapidly changing set of technologies. For example, some models may use PySpark, while others may use a particular flavor of R. There may not be a standard way of describing what artifacts and supporting infrastructure need to be deployed when deploying these models either.

Existing solutions to these challenges may include containerizing everything using, for example, Docker. However, unless the developers stick with this approach during the whole development process, an image-creation development and maintenance task may need to be performed. Some existing approaches may translate every model into some neutral equivalent languages (e.g. PMML or PFA), which may require that every computation be expressed with these languages.

It may also be challenging to deploy, maintain, and synchronize models that are associated with computations on very large datasets, with large hardware arrays performing the training and calculations, where versioning and synchronizing of models may become a critical task. This is especially true with streaming datasets.

The machine learning platform disclosed herein may manage different machine learning models or different versions of a machine learning model, and facilitate the evaluation of the machine learning models and the selection and deployment of the machine learning model for production. The machine learning platform may also collect and report information, such as scores of the model applied to the input data or statistics about the usage of a model, which may be used to improve the model or the selection of the model by a selector. In some cases, the machine learning platform may use the selector to select an appropriate model for a give dataset from a number of available models.

FIG. 1 illustrates a simplified block diagram of an example machine learning platform 100 according to certain embodiments. In some embodiments, machine learning platform 100 may be integrated with a business intelligence (BI) platform, such as Data Visualization Desktop (DVD)/Oracle Analytics Cloud (OAC). In the example, ML platform 100 may include a model store 110, a model generator 120, and a model management and scoring platform 130. Model generator 120 may be used to generate LM models using data flow. Model management and scoring platform 130 may be used to import externally generated ML models and manage (e.g., add, remove, or retrieve), evaluate (e.g., compare and score), deploy (e.g., select models for deployment and select deployment strategy) or un-deploy, and update (e.g., modify based on feedback) M1 models in model store 120. Model store 110 may store ML models generated using model generator 120 of ML platform 100 and ML models imported from external sources. Model store 110 may also store various metadata associated with the ML models.

An ML model can be generated using model generator 120 of the ML platform by invoking a "create model" API. The data from data flow may be input into model generator 120 through a user interface (UI) 122. Feature vectors may then be extracted from the data and used to train the ML model. The trained model may be saved to model store 110. In some embodiments, model generator 120 may retrieve an existing model from model store 110, retrain the existing model using incoming data to generate a new model (e.g., a new version of a model), and save the new model to model store 110.

Model management and scoring platform 130 may import external models through an API 132, and convert the external models that have different schema into models that share a same schema as described in detail below. The created or imported models may be managed, evaluated, deployed, and updated by model management and scoring platform 130. For example, model management and scoring platform 130 may selectively retrieve models from model store 110 and publish or deploy the selected model for analyzing online data. The scores may be feedback to model management and scoring platform 130 through a UI 134.

Figure 2:
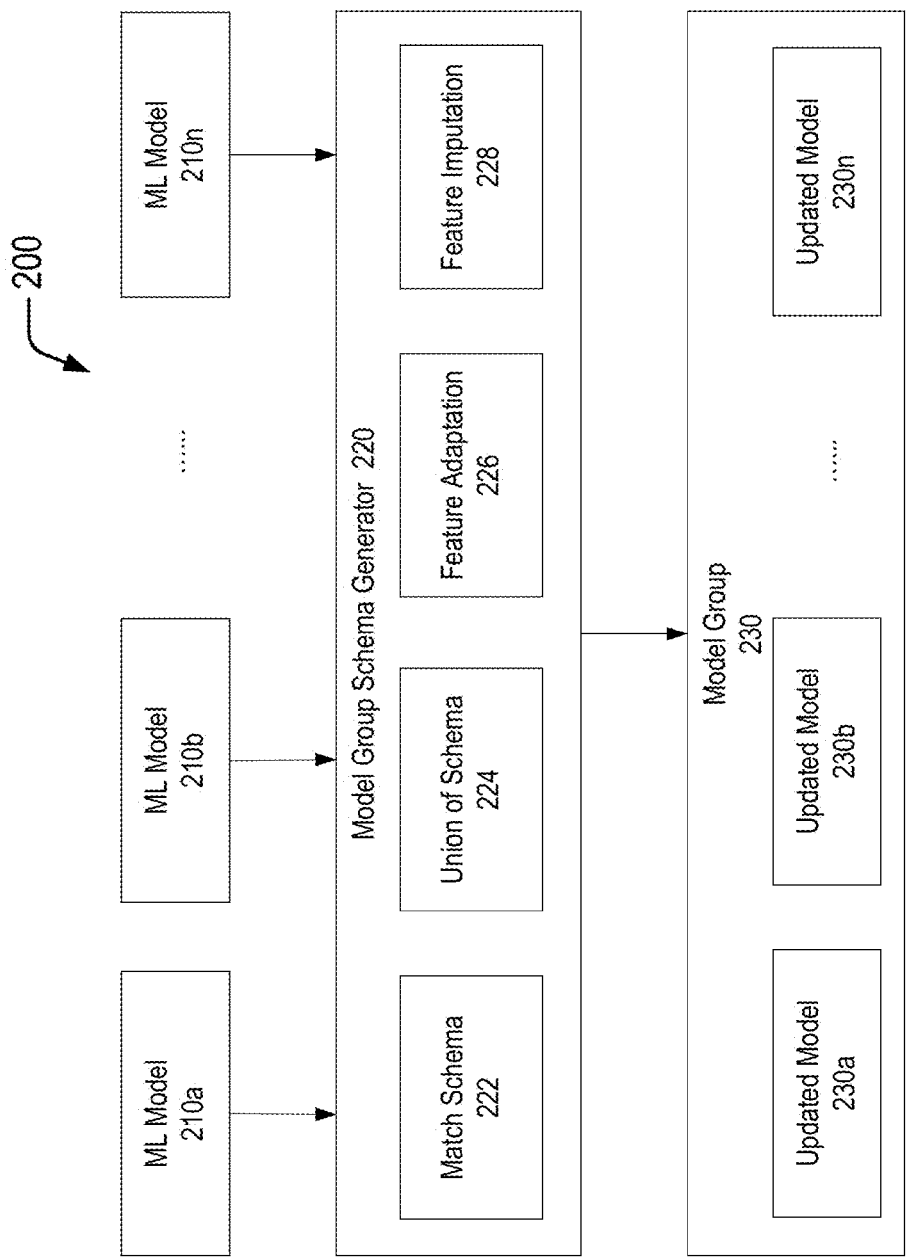
FIG. 2 illustrates an example of processing for generating a common schema for machine learning models having different schema by an example machine learning platform according to certain embodiments.

FIG. 2 illustrates an example of processing 200 for generating a common schema for machine learning models (e.g., models 230a, 230b, . . . , and 230n) that may have different schema by an example machine learning platform according to certain embodiments. A machine learning model may have a schema defining different aspects of machine learning. For example, a schema may specify the shape of feature vectors to be sent to the ML model for scoring. The schema may define the name and datatype of features in the feature vector. The schema may also include representations of algorithms and parameters for implementation and the software for the model. Different models may have different schemas. The processing illustrated in FIG. 2 may be used to add models with different schemas into a model group that has a common schema for models in the model group such that the models can all be used interchangeably for the same type of data or a same application.

The common schema of the models that are to be added to a model group may be inferred from the schema of the models in several ways. For example, the schemas may be compared by a match schema module 222 in model group schema generator 220. If models 230*a*, 230*b*, . . . , and 230*n* have the same or consistent schemas, the schema of the model group may be the same as that of any of models 230*a*, 230*b*, . . . , and 230*n*. In some embodiments, a union of schema module 224 may be used to generate a schema that is the union of the schemas of models 230*a*, 230*b*, . . . , and 230*n*. Thus, the schema of the model group may be wider than the schema of each model. Each model may select the required features for scoring. With this technique, there may be conflict if two or more models have features with same name, but different datatypes or semantics.

In some embodiments, if two models have features with the same name and "congruent" datatypes, such as (latitude, longitude) coordinates and geohash, one of these datatypes may be used as the datatype for the feature of the model group. In some embodiments, a feature adaption module 226 may be used to transform or convert the datatype for the feature of the model to the datatype for the feature in the model group type, or vice versa, such as converting datatype from (latitude, longitude) to geohash, or vice versa. In some embodiments, the ML models stored in model group 230 (e.g., in model store 110) may not be converted or transformed, and the conversion or transformation may be done when the model group is read from the model store. In some embodiments, models can be evaluated by a feature imputation module 228 to assess the importance of certain features in the models. Features that are different in different models and have importance levels higher than a threshold may be added to the schema of model group, while some features that are different in different models and have importance levels lower than another threshold may be dropped or ignored.

As a result, a common schema may be generated for the model group and may be used to convert models 210*a*, 210*b*, . . . , and 210*n* to updated models 230*a*, 230*b*, . . . , 230*n* in model group 230.

Figure 3:
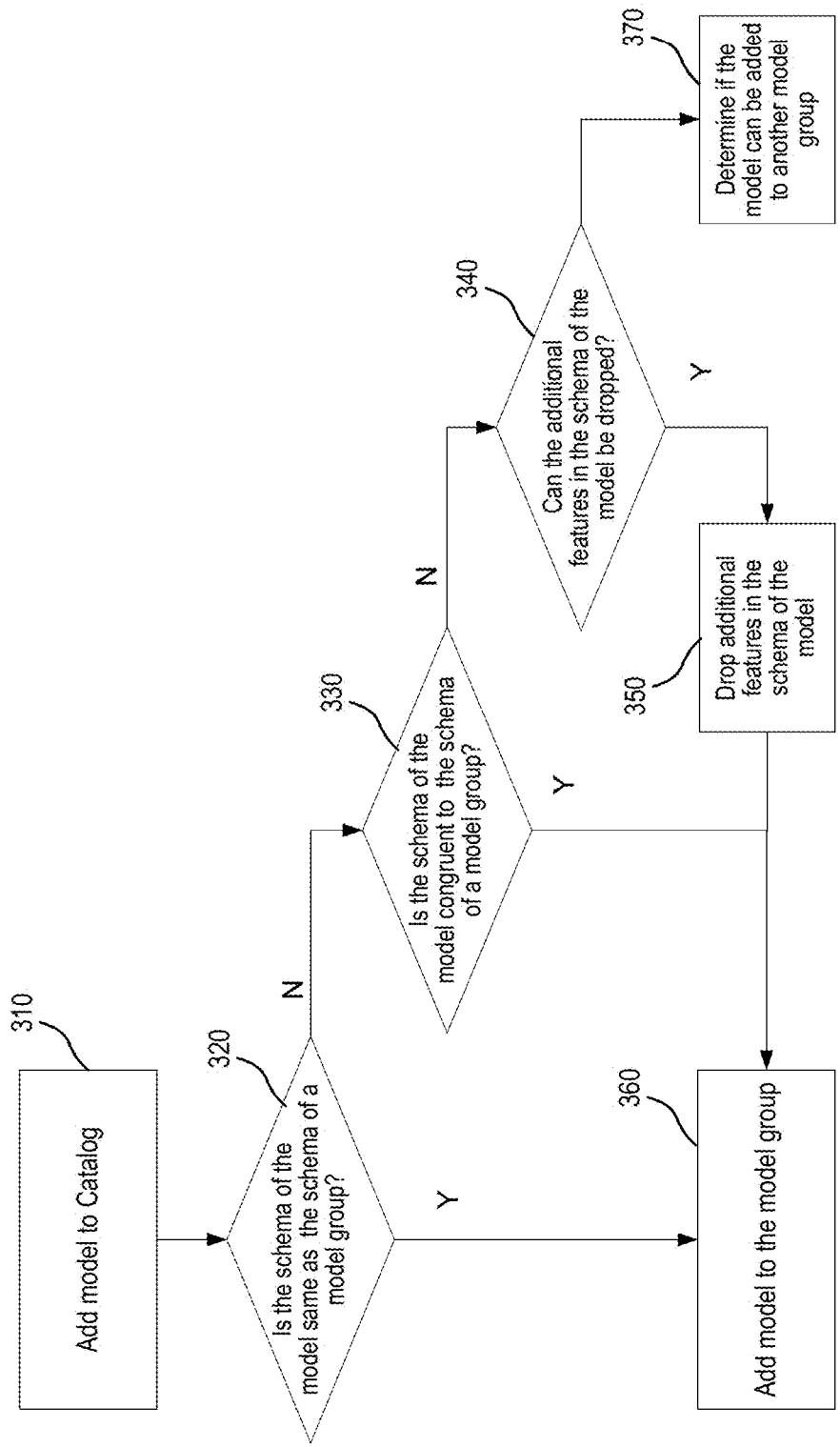
FIG. 3 illustrates an example of processing for converting models having different schema into models sharing a same schema in a model group by an example machine learning platform according to certain embodiments.

FIG. 3 illustrates an example of processing for converting models having different schema into models sharing a same schema in a model group by an example machine learning platform according to certain embodiments. The processing depicted in FIG. 3 may be an inverse of the processing described in FIG. 2 where a common schema is derived from schemas of individual models. In the example illustrated in FIG. 3, a common schema may first be defined for a model group and models matching the common schema or congruent to the common schema can be added to the group, for example, dynamically.

At 310, a new model may be trained and added to a catalog. At 320, the machine learning platform may determine whether the schema of the new model is the same as or matches the common schema of the model group. If the schema of the new model is the same as or matches the common schema of the model group, the new model may be added to the model group at 360. Otherwise, the machine learning platform may determine at 330 whether the schema of the new model is congruent to the common schema of the model group. Two schemas are congruent if all feature vectors and datatypes of the feature vectors for the two models match or if the datatype of a feature in one model can be adapted to the datatype of a corresponding feature in another model as described above with respect to feature adaptation module 226. If the schema of the new model is congruent to the common schema of the model group, the datatype in the new model may be converted and the new model may be added to the model group at 360. In some embodiments, the new model may not be converted before being stored and a model converter may be used to convert the stored model to a model conforming the common schema when the new model is to be used. If the schema of the new model is not congruent to the common schema of the model group, the machine learning platform may determine at 340 whether additional or different features in the schema of the new model can be dropped/imputed as described above with respect to feature imputation module 228. If so, the additional or different features in the new model may be dropped at 350, and the revised model may be added to the model group at 360. Otherwise, the new model may not be added to this model group. Rather, at 370, the machine learning platform may determine if the new model can be added to a different model group using the techniques described above.

Figure 4:
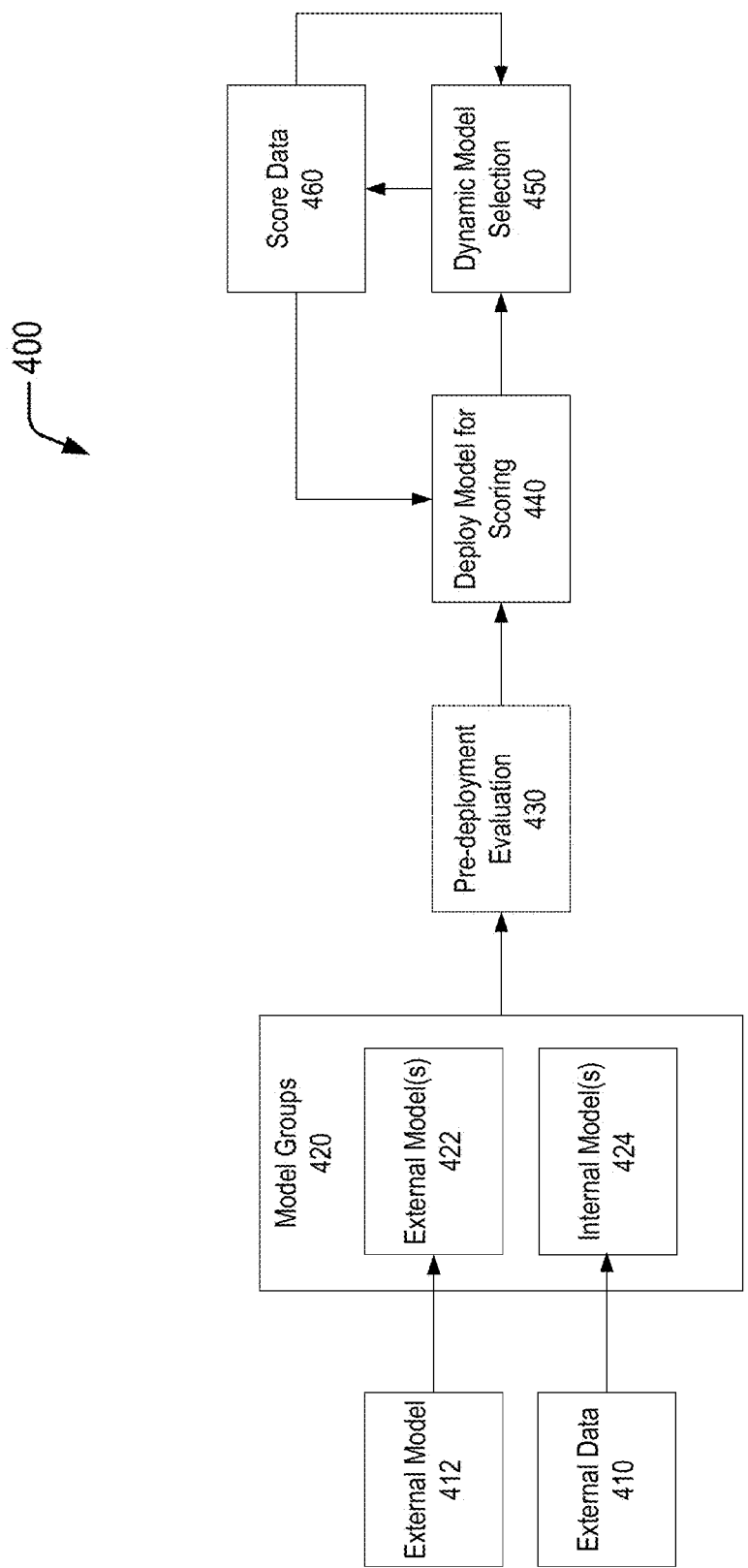
FIG. 4 illustrates an example of a usage flow of a machine learning platform for managing and evaluating (e.g., scoring) machine learning models according to certain embodiments.

FIG. 4 illustrates an example of a usage flow 400 of a machine learning platform for managing and evaluating (e.g., scoring) machine learning models according to certain embodiments. The machine learning platform disclosed herein may enable managing machine learning models and deploying and analyzing data using appropriated models. The machine learning platform can be used by model developers to evaluate various models and deploy models to production, or by applications to select and deploy appropriated models to analyze data for the application.

In one example, at 410, a user may train an ML model (e.g., retrain an existing ML model) using data from a data flow. The trained model may be saved as an internal model 424 in a model group 420. The model may be given a name in this step. Every time the data flow is executed, a new model may be created. Various models generated by successive executions of a data flow are different versions of the model corresponding to the data flow. At 412, an external model 412 built outside of the ML platform may be saved as an external model 422 in model groups as described above with respect to FIGS. 2 and 3. In some embodiments, the models imported into the system may be in, for example, a predictive model markup language (PMML) format.

At 430, the ML platform may manage the models (including versions) to, for example, search models, evaluate models with various test datasets to ensure that a model is ready for publishing for wider usage, compare versions of models in various dimensions (e.g., hyper-parameters of models, metrics of models, etc.). For example, the machine learning platform may allow users to: import/export models, evaluate and compare various models (prior to deployment for scoring), manage various versions of models, deploy/un-deploy models, and transparently retrain models with recent data to prevent model drift. In some embodiments, the machine learning platform may provide API(s) for retrieving a list of models based on several search criteria, which may support name-based search. In some embodiments, the machine learning platform may manage several versions of a model.

In some embodiments, the machine learning platform may provide API(s) for evaluating a model using test data. In some embodiments, the machine learning platform may provide API(s) for comparing different models, comparing different versions of a model, or comparing a rule-based model (or manually crafted model) and a machine learning model. For example, in some embodiments, the machine learning platform may provide API(s) for comparing several versions of a model in certain dimensions, such as various hyper-parameters of models, metrics of models, and the like. In some embodiments, the comparison may be visualized using the ML platform.

In some embodiments, the machine learning platform may provide API(s) for publishing a version of a model for scoring. In some embodiments, the API(s) may specify whether a given version is the default version for scoring. In some embodiments, the machine learning platform may provide API(s) for importing and/or exporting a model. In some embodiments, the machine learning platform may provide API(s) for deleting a model. In some embodiments, the machine learning platform may support periodically publishing a model at a given frequency to implement continuous learning of a model using new data in new time windows. In some embodiments, the machine learning platform may provide API(s) for suggesting a model for a given dataset. Some examples of APIs are described in the Apendix in U.S. Provisional Patent Application No. 62/568,052, filed on Oct. 4, 2017, entitled "Machine Learning Platform".

At 440, the machine learning platform may publish one or more models or model groups for scoring using online data. At 450, if multiple models (e.g., multiple version of a model) or a group of models are published for scoring, these models or versions of a model can be dynamically selected by a selector based on certatin rules or strategies, such as partitioning input data among these models or versions randomly, sequentially, based on assigned frequencies, based on attributes of the input data, or based on certain learned rules or criteria. The dynamically selected models may be applied to real time input data to generete inference results. At 460, score data may be generated based on the inference results. The score data may be feedback to the machine learning platform to improve one or more models or to improve the the selector that dynamically selects the models.

In some embodiments, the machine learning platform may provide API(s) for analyzing data specified online in a request or in a dataset in, for example, Oracle Analytics Cloud (OAC). In some embodiments, data specified for analysis may be ready for analysis. For example, the data may include all features required by the ML model. In other words, any preparation step required on the data may not be done in API(s) and may be done prior to invoking the API(s). In some embodiments, at least some data preparation steps may be performed using the API(s). In some embodiments, the machine learning platform may provide API(s) for supporting simultaneous testing of several versions of a model. The API may allow defining rules for distributing input data among the different versions of models. The rules may support, for example, percentage-based partitioning and/or attribute value-based partitioning of input data. A scoring response may include the version of the model that was used to score the request. The version information may be used in the application layer to gather statistics regarding effectiveness of the model.

In various embodiments, the machine learning platform may be configured such that online data may be analyzed with a very low latency, for example, in the order of 1 ms. Batch data may be analyzed with a very high throughput, for example, in the order of a million or more records per second. There may be no downtime when model versions are being swapped.

In some embodiments, the machine learning platform may provide API(s) for submitting feedback on predictions for a given model. The feedback may include actual values for a given record. The feedback can be used to evaluate a model by comparing the actual values with predicted values.

In some embodiments, the machine learning platform may provide API(s) for reporting statistics on the usage of a model, such as the number of requests served by the model in a given time window, and the distribution of predictions by category for classification models and binning for regression models.

Models published for scoring may be refreshed as new models are available with new training data. This would allow transparently retraining models with recent data to prevent model drift.

The machine learning platform may be automated. For example, the machine learning platform may be configured to run testing or update models at a certain frequency, such as nightly or weekly. The machine learning platform may be configured to support unit tests and end-to-end tests. The machine learning platform may be configured to support both golden sets and thresholds (notion of test pass fail under some conditions). The machine learning platform may also support correctness as well as performance tests.

In some embodiments, the machine learning platform may also perform security control, such as performing user authorization and/or authentication, rate limiting by user IP address, rate limiting by time, etc.

In some embodiments, the machine learning platform may be executed on a distributed system for improved performance, such as improved efficiency.

Figure 5:
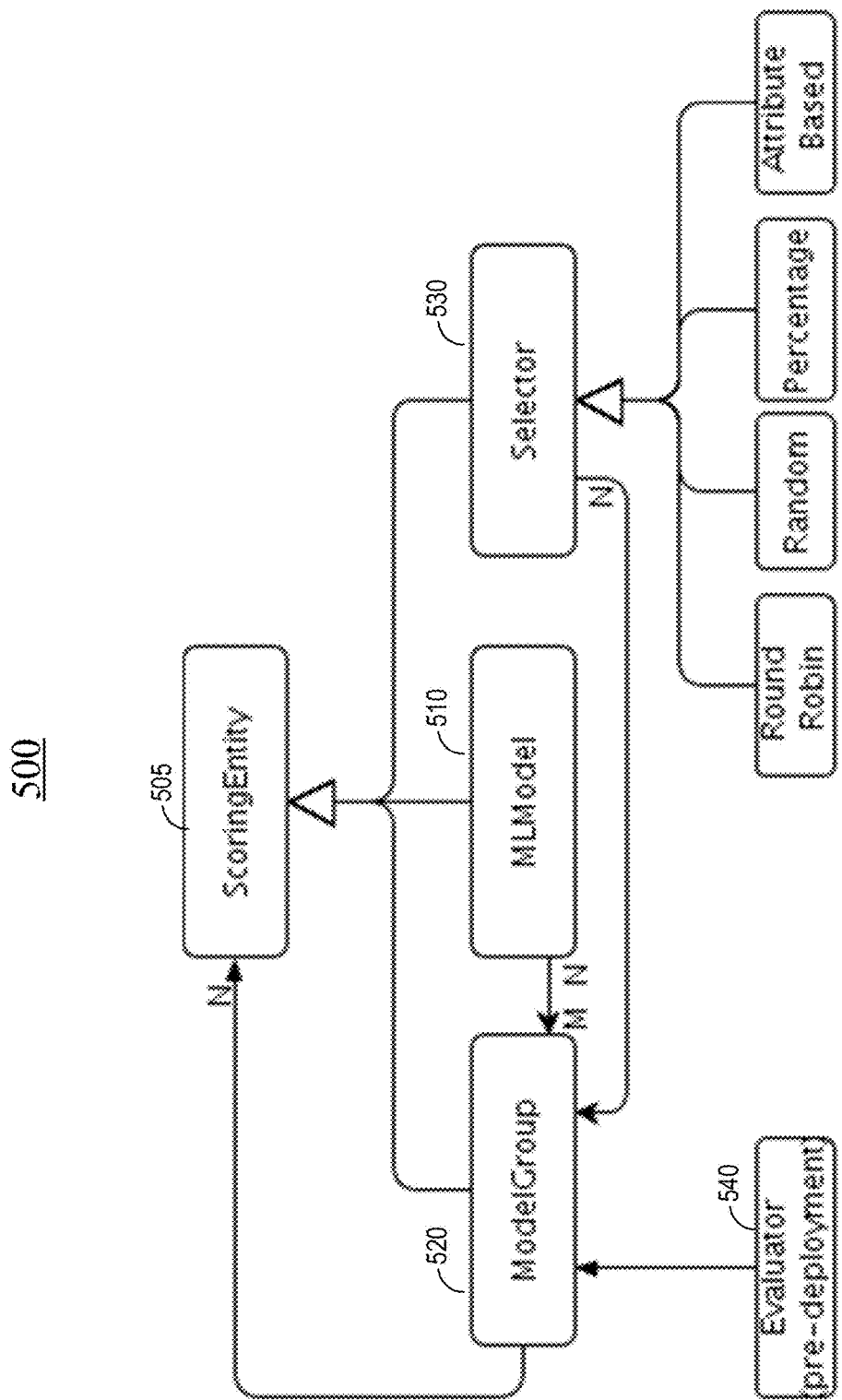
FIG. 5 illustrates an example of a model selector for selecting a scoring entity on a machine learning platform according to certain embodiments.

FIG. 5 illustrates an example of a selector 530 for selecting a scoring entity 505 on a machine learning platform according to certain embodiments. Selector 530 may be used at 450 of FIG. 4 for dynamic model selection. Scoring entity 505 may include any entity that can be used to analyze given input data (e.g., performing inferences using the input data) and the analysis results may be used to determine a score for scoring entity 505. For example, scoring entity 505 may include an ML model 510, a model group 520, or selector 530 in combination with model group 520.

ML model 510 may include a machine learning model created externally or created (or retrained) using the machine learning platform based on a data flow as described above with respect to FIGS. 1 and 4. ML model 510 may include a schema of feature vectors and target variables. After an ML model is created, it can be evaluated with various test datasets and subsequently deployed for scoring. An ML model may be exported to a standard machine learning model format, such as PMML. Multiple versions of a model can be created by creating these models with the same name. The different versions may have different model IDs.

A Model group 520 may include a set of models, which, in some cases, may have a common schema that can be used for performing operations, such as evaluating and comparing several models. Models can be added to or removed from a model group. In some embodiments, a model group can be used as an abstraction of a set of models sharing a common schema. For instance, an application may use a model group that includes a first model M1. When a new model M2 is created later to replace first model M1, the application may seamlessly transition to using the new model M2, without knowing the underlying change. Data can be used for scoring against a group. For example, data can be used for scoring against a model group directly or using a selector as described throughout this disclosure. In some embodiments, when scoring directly (i.e., without using a selector) against a model group, the data may be analyzed using a randomly chosen model in the model group.

Selector 530 may be used to select one or more models among models within a given model group to analyze given input data (e.g., make inference or prediction based on the input data). In some embodiments, selector 530 may select models randomly or sequentially in a round robin manner. In some embodiments, selector 530 may use certain rules to select one or more models from the models in the model group. For example, a selector may use frequency-based partitioning for scoring (e.g., distributing input data to models based on certain split ratios, such as AB testing), attribute-based partitioning of scoring, multi-armed bandit strategies, etc. In some embodiments, a selector may use rules defined based on certain business rules. In some embodiments, a selector may learn or may refine some rules for selecting models based on the score data for previous selections, for example, dynamically in a production environment. The selection may be based on some business goals or key performance indications, which may be used as scoring metrics to score the scoring entity based on the inference results of the scoring entity against input data. For example, as described above, the scoring metrics may include how long customers stay on a website or how often customers visiting a website purchase an item or service at the end. The selector may be scored together with the model group as a scoring entity to determine the performance of the models dynamically selected by the selectors from the model group.

An evaluator 540 may be used to evaluate various models offline, such as scoring them on a test dataset to compare their accuracy, before deploying one or more of these models for scoring. Evaluator 540 may allow users (e.g., developers or data scientists) to compare a set of models trained with various hyper-parameters, algorithms, and the like, for a given ML problem against various accuracy criteria, such as confusion matrices, area under the receiver operating characteristic (ROC) curve (AUC), and the like. In various embodiments, the comparison may be between different models, between different versions of a model, or between a rule-based model (or manually crafted model) and a machine learning model. In some embodiments, the comparison may be visualized using the ML platform. Based on the results of this evaluation, one or more of these models can be chosen to be deployed for scoring.

As described above, in some embodiments, the machine learning platform may be used to deploy a model group and a selector in a production environment, and the selector may learn to dynamically select the model(s) from the model group in the production environment in different contexts or for different input data based on a score determined using certain scoring metrics, such as certain business goals. For example, in some embodiments, the selector may select different models for different input data. In this way, the models in a model group may be dynamically selected and used in the production environments, and the selector may be trained to adaptively select the appropriated models in the production environments. By training the selector in the production environment to dynamically select a model or a combination of different models from a model group, the model group and the selector may achieve the optimum results in any context and for any input data.

Additionally or alternatively, in some embodiments, the selector may determine a strategy (or scheme) for combining two or more models for analyzing the same data. For example, a selector may be trained to learn or improve rules for selecting one or more models from the model group and/or determining a strategy for combining the one or more models to analyze input data, such as using a weighted sum of results from multiple models for the same input data as the results for the input data, or using a voting mechanism to select the most common results from the multiple models for the same input data as the final results for the input data.

Figure 6:
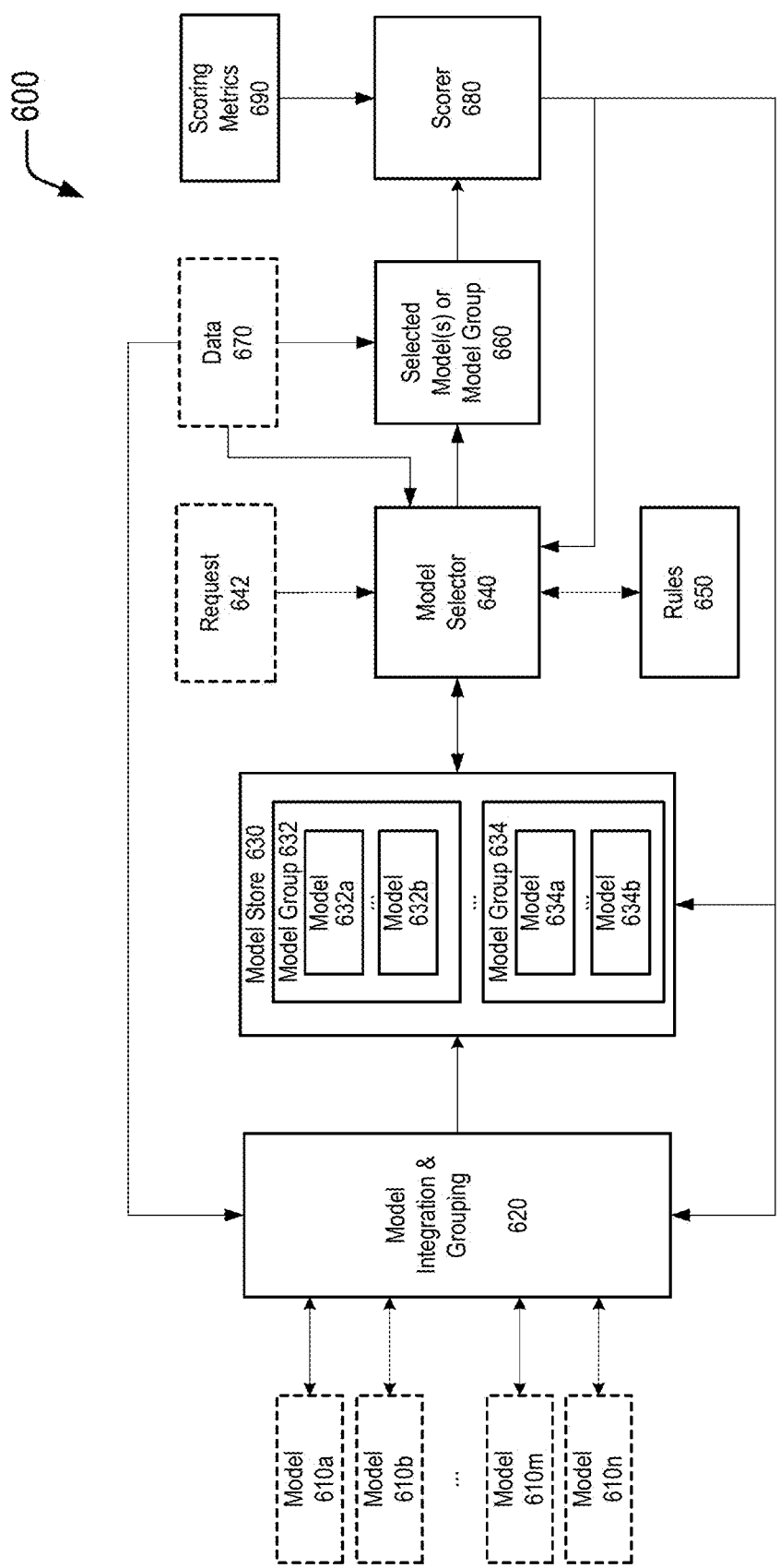
FIG. 6 is a block diagram of an example of a machine learning platform for converting, grouping, selecting, and evaluating machine learning models according to certain embodiments.

FIG. 6 is a block diagram illustrating an example of a machine learning platform 600 for converting, grouping, selecting, and evaluating machine learning models according to certain embodiments. FIG. 6 shows various resources in the example machine learning platform that can be used to implement various applications, such as analyzing data using a model, analyzing data using a set of models, analyzing data using a set of models and a selector, training or retraining models on different time-windows (e.g., monthly, quarterly, etc.), refreshing the deployed models for scoring, and understanding usage characteristics of a model. The resources and corresponding APIs may also facilitate the evaluation of machine learning models, such as comparing a set of models trained on different datasets, different hyper-parameters, or different algorithms.

ML platform 600 may include model integration and grouping module 620, which may be used to train or retrain ML models, import externally generated ML models, create a common schema and convert models using the common schema, and group models into model groups. For example, model integration and grouping module 620 may integrate and group models 610*a*, 610*b*, . . . , 610*m*, and 610*n* in to model groups, and save the models belonging to different model groups in a model store 630. Model store 630 may store a plurality of ML models, which may be organized into model groups. For example, as illustrated, model store 630 may store one or more model groups 632, . . . , and 634. Model group 632 may include a set of models 632*a*, . . . , and 632*b*. Model group 634 may include a set of models 634*a*, . . . , and 634*b*. In some embodiments, models in a model group may share a same schema or may be converted to models sharing the same schema by a model converter.

ML platform 600 may include a model selector 640 associated with one or more model groups. When a request 642 for models for an application is received, model selector 640 may be deployed with a model group to dynamically select models in the model group for analyzing data in the production environment. Model selector 640 may use a set of rules 650 to dynamically select the appropriated models and/or a strategy (or scheme) for combining the models as described above. In some embodiments, rules 650 may be provided by a developer. In some embodiments, model selector 640 may be trainable. For example, in some embodiments, at least some rules in rules 650 may be learned or refined by model selector 640 during the processing of online data in the production environment. In some embodiments, model selector 640 may select models based on a machine learning model, rather than based on a set of rules.

The selected models or model group 660, including the models dynamically selected by model selector 640 from a model group, may be applied to input data 670. The results from selected models or model group 660 for input data 670 may be used by a scorer 680 (e.g., a score server) to determine a score for the selected models or the combination of the model group and model selector 640. Scorer 680 may use scoring metrics 690 to determine the score. In some embodiments, scoring metrics 690 may be determined based on some business goals, such as how long customers stay on a website, how often customers visiting a website purchase an item or service at the end, how often are transactions successful, user satisfaction and positive feedback, and the like.

The score from scorer 680 may be feedback to model selector 640 for improving the model selector, such as improving the rules used to select models and the model combining strategy. The score from scorer 680, along with some input data 670 may be sent to model integration and grouping module 620 for retraining some models, where the retrained models may be saved as new models in a model group in model store 630.

In some embodiments, the results from selected models or model group 660 and the score data from scorer 680 may be sent to model store 630 and saved as metadata associated with the models. In some embodiments, statistical data for the models, such as how often a model is used, the accuracy of the model, the average execution time of the model, and the like, may be generated as well.

Figure 7:
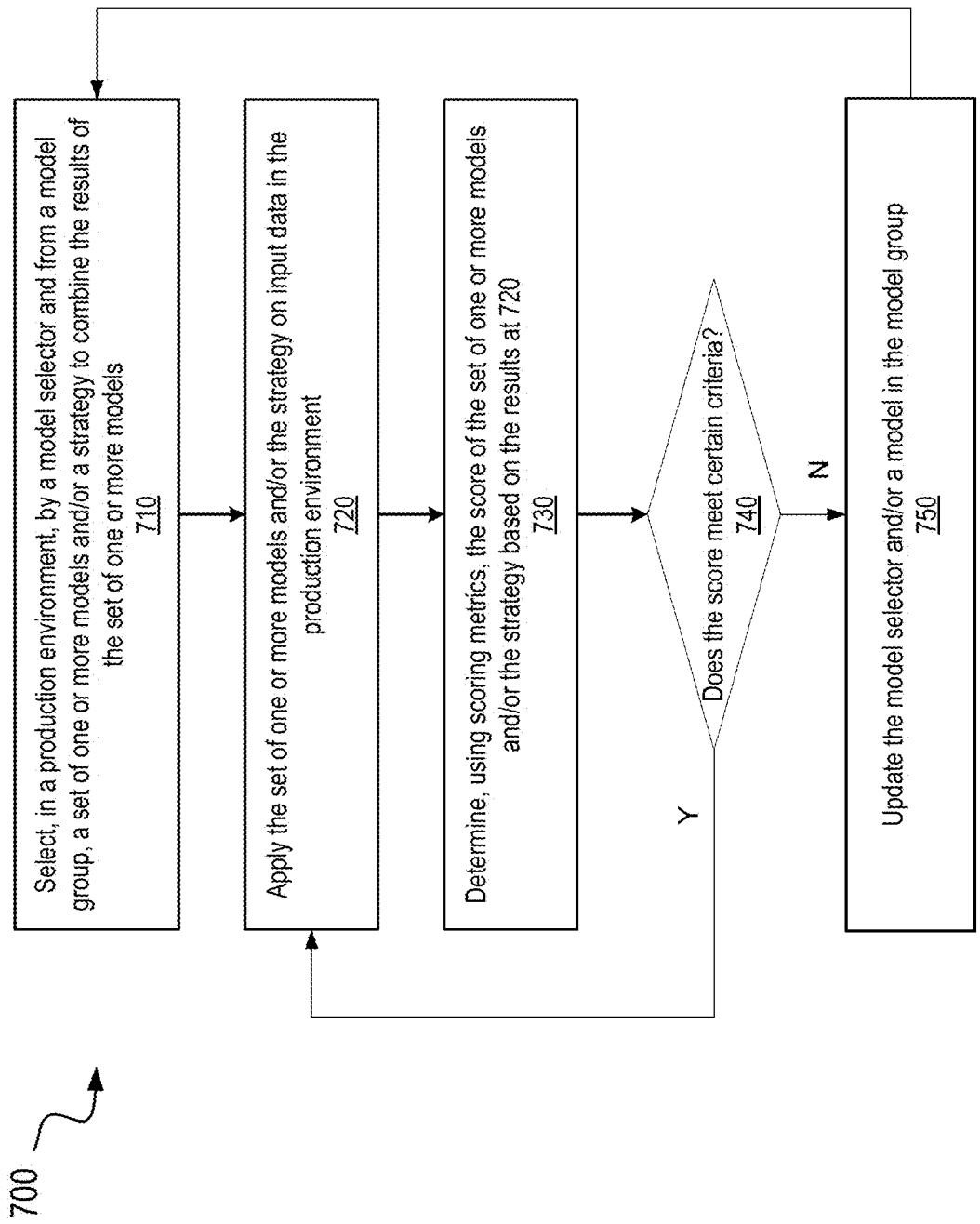
FIG. 7 is a flowchart illustrating an example of processing for dynamically selecting machine learning models in a production environment using a trainable model selector on a machine learning platform according to certain embodiments.

FIG. 7 is a flowchart 700 illustrating an example of processing for dynamically selecting machine learning models in a production environment using a trainable model selector on a machine learning platform according to certain embodiments. The processing illustrated in FIG. 7 may be used to determine an optimized model selection strategy that may be a function of input data, scoring metrics (e.g., metrics to determine how well a strategy is performing), and historical states (e.g., prior strategies). The processing depicted in FIG. 7 may be performed by a machine learning platform described above. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel.

The processing may start at a state where the selector may know nothing about the effectiveness of any of the models in a model group. Models may be selected and used to analyze input data, and the results from the models may be used to determine the scores for the models. This score may be determined based at least in part on some business KPI metrics that the model selection strategy has no understanding. The models and the selection strategies may be gradually optimized based on the feedback, including the scores and/or the results from the models. Using this processing, the model selector may learn the best model or group of models to use. In some embodiments, the model selection strategy does not merely include selecting a best model from n models. Instead or additionally, the model selection strategy may include using voting results from a subset of models. For example, if 3 out of 5 models generate a same result, the result may be used as the result for the group, while results from the other two models may be discarded or may be saved for debugging and improving the other two models.

At 710, in a production environment, a model selector may select, from a model group, a set of one or more models and/or a strategy to combine the results of the set of one or more models. The model group may be as described above, and may include one or more models, such as different versions of an original model. The model selector may select the one or more models and/or the strategy based on input data, including transactional data (e.g., user input data or user interactions) or contextual data (e.g., parameters associated with the input data or interactions, such as time, IP address, location, geographical region, communication channel or platform (e.g., browser or app used), and the like). In some embodiments, the model selector may select the one or more models and/or the strategy based on certain rules. In some embodiments, the model selector may select the one or more models and/or the strategy using a machine learning model.

At 720, the set of one or more models and/or the strategy may be applied on input data in the production environment. The selected one or more models may be used based on the selected strategy to analyze the input data. For example, the one or more models may be chosen randomly, sequentially, based on determined split ration, or based on the input attributes (e.g., the contextual data). As another example, the one or more models may be applied to the same input data, and the most common results or some weighted sum of the results from the one or more models may be used as the results of the group of models for the input data.

At 730, a score for the set of one or more models and/or the strategy may be determine based on the results at 120 and scoring metrics. For example, as described above, in some embodiments, the score metrics may include some business goals or key performance indicators, such as how long customers stay on a website, how often customers visiting a website purchase an item or service at the end, how often are transactions successful, user satisfaction and positive feedback, and the like.

At 740, it may be determined whether the score meet certain criteria, such as greater than a threshold. If the score meets the criteria, there may be no change to the models and the selector. The one or more models and/or the combining strategy may continue to be used for the input data at 720 and 730 until a score fails to meet the criteria at 740, at which point, the processing may move to 750. If the score does not meet the criteria, the model selector and/or some models in the model group may be revised at 750, and the processing may then proceed to 710 to re-perform the processing at 710-740.

In some embodiments, an ML platform may include a set of one or more ML platform servers. Each ML platform server may include one or more ML platform applications and one or more scoring servers. The ML platform application may be deployed on a machine learning platform server, such as an Oracle WebLogic server (WLS). In some embodiments, the machine learning platform described herein may be integrated with a decision support system (DSS). The ML platform may have various integration points with the DSS. The ML platform artifacts, such as models, model groups, and selectors, may be stored in the DSS. These artifacts may be stored and retrieved via the DSS REST APIs. The ML platform may include a design extensible architecture for scoring models in various formats (PMML, PFA, scikit-learn, sparkML, etc.). The ML platform may interact with a decision support system (DSS) for all metadata related operations, and interact with the scoring servers for scoring using given data.

The scoring servers may score a given model using the given data. In some embodiments, Each scoring server may handle scoring requests for a particular type of models. For example, a python scoring server may serve requests for scoring python scikit-learn models, a PMML server may serve requests for scoring PMML models, and so on. The models used for scoring may be loaded from a local file system. The scoring servers may have long running contexts that may help to serve scoring requests instantaneously, thus avoiding the overhead in spinning up the context, such as creating python environment, spark context, and the like. In some embodiments, the create, read, update, and delete (CRUD) operations on the artifacts may be implemented using corresponding DSS REST APIs. A model can be deployed or un-deployed using deploy or un-deploy API(s) of a model. When a model is deployed or un-deployed, the model object in DSS may be updated to change its state using a DSS REST API.

Data can be analyzed using ML platform' scoring API(s). The data may be analyzed using a model, a model group, or a selector as described above. In some embodiments, the ML platform server may check whether a model with a given model ID is available in a local file system. If not, the ML platform server may download the model from the DSS using the DSS REST API and store it in local file system. Before downloading the model, the ML platform server may check whether the collective size of models in the local file system is within a given limit. If not, the least recently used model(s) in the file system may be deleted. The ML platform may invoke an appropriate scoring server based on the type of model to score the model using the given data. The scoring server may load the model from the file system and analyze the given data using the model. The ML platform server may include the model ID in the scored data, generate a request ID for the request, log the scoring results with the request ID into a "scoring log," and return the scored data.

In some embodiments, when data is to be analyzed by a model group, a model within the group may be selected randomly to analyze the given data. The data may be analyzed using the selected model and a score may be generated based on the analysis results as described above.

In some embodiments, when data is to be analyzed on a selector, one or more models within the group associated with the selector may be selected based on rules or a model for the selector as described above. The data may be analyzed using the selected one or more models and a score may be generated based on the analysis results as described above.

The feedback on scoring can be submitted using a feedback API. For example, the feedback information may be stored in a feedback log. In some embodiments, the feedback information may include the request ID that was returned in scoring response and expected value for a record in the request. The feedback information may be correlated with the scoring log to assess model quality.

In some embodiments, an externally created model can be imported using a "create model" API of the ML platform. For example, the "create model" API of the DSS may persist the given model into the DSS. Models may be exported using the export API of the ML platform. The export API can retrieve the model from the DSS using the "get model" API of the DSS and return the retrieved model.

In some embodiments, when an 'apply model' node is created in a data flow, the DSS may display all scoring entities (e.g., deployed models, model groups, and selectors) so that the user can choose any of these entities for scoring. When the data flow is executed, the DSS may specify the chosen scoring entity when invoking the ML platform scoring API.

In some embodiments, when a data flow with the 'apply model' node is executed, a multipart file with the data and the schema of the model may be created and posted to the ML platform scoring API. The scoring entity to be used for scoring may be specified in the request. The ML platform server may analyzing the given data as explained above and return the scored data in the response. The data may be saved to a location specified by the data flow.

In some embodiments, a machine learning platform server may be deployed for each respective tenant. The concept of tenancy may be introduced in the following areas to support multi tenancy: (1) storage of ML platform artifacts in DSS (e.g., whenever the DSS is migrated to a multi-tenant architecture, the ML platform artifacts will be migrated accordingly); (2) model cache in scoring server (e.g., the model cache in the scoring server may be striped by tenant ID so that models of different tenants may not overwrite each other); and (3) resource allocation (e.g., compute resources for the ML platform server may be partitioned for tenants hosted in a point of delivery (POD) to avoid noisy-neighbor problems).

In some embodiments, the ML platform may be scaled by adding or removing ML platform server. Each ML platform server may be a stateless server. In some embodiments, the requests to these servers may be load-balanced by a load balancer (e.g., LBaaS). Integration of the ML platform may include, for example, integration between data flows and the ML platform for training models, integration with dataflow execution framework for scoring datasets, integration with DSS as a repository for ML platform metadata, and scalable storage design for storing model predictions and feedback.

Described below is an example work flow using an example of a machine learning platform according to certain embodiments. The work flow may be used by a developer (e.g., a data scientist) to perform various operations on the machine learning platform. The work flow may be used by the developer through either user interfaces or by executing code.

Figure 8:
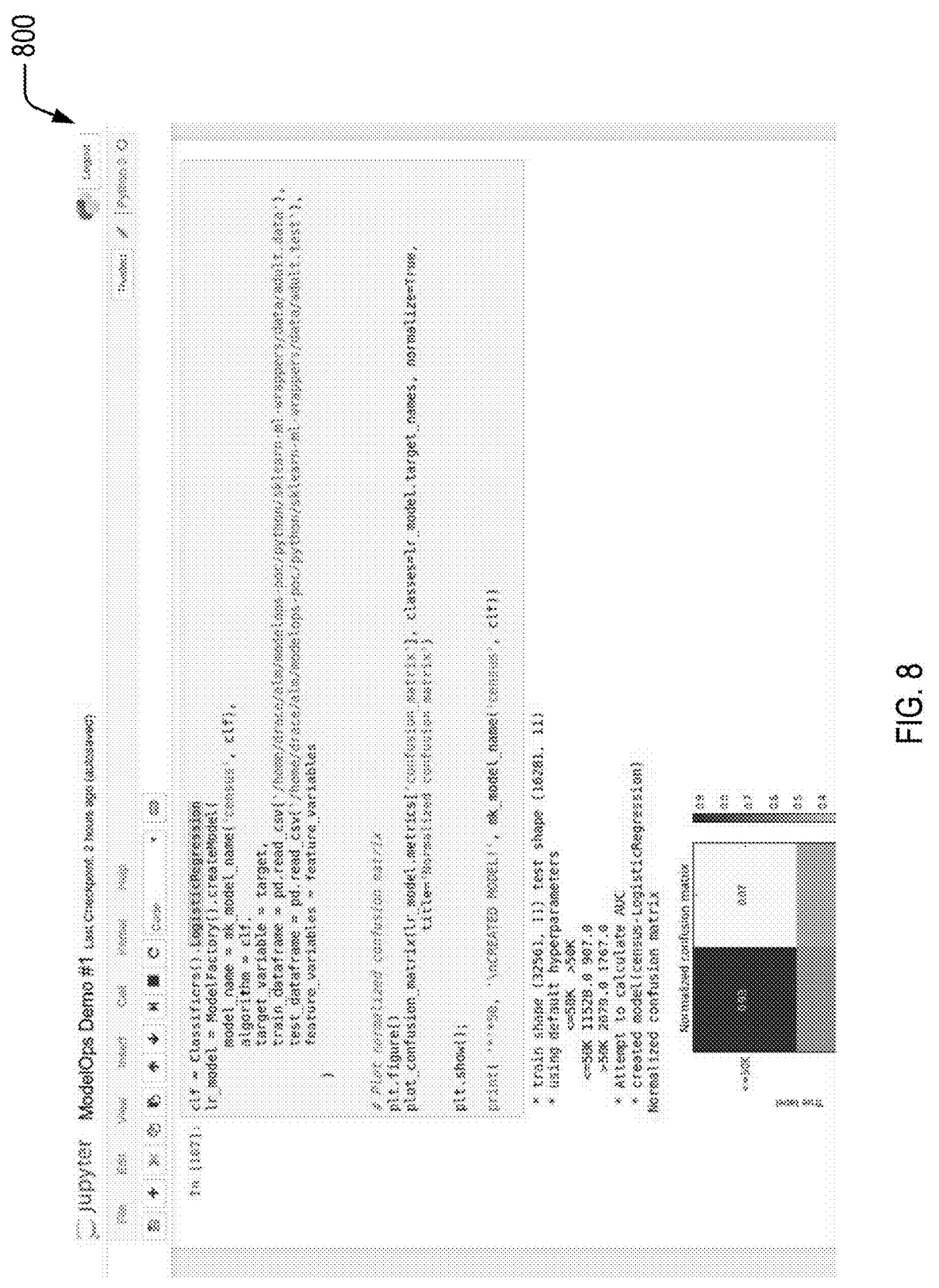

The developer, such as a data scientist working on a dataset, may create a machine learning model. FIG. 8 illustrates an example machine learning model created by a developer according to certain embodiments.

Figure 9:
FIG. 9 illustrates an example user interface for uploading a machine learning model to an example machine learning platform according to certain embodiments.

The developer may have created a model using existing tools, and then use the ML platform to upload and deploy the model. FIG. 9 illustrates an example user interface for uploading a machine learning model to an example machine learning platform, according to certain embodiments.

After the model is uploaded to the ML platform, the ML platform may begin the management of the model. The initial state of the model is un-deployed, which keeps it from being used until the developer decides that it should be published by toggling the deployment state. A model group may be created so that models within that group can be compared later. A model group may be a container construct that enforces some degree of uniformity of the models within that group. The developer may also create a selector entity that can be used to work with the model group. FIG. 10 illustrates example code for creating an example model group and an example selector entity for an example machine learning model on an example machine learning platform according to certain embodiments. As discussed above, the model group and/or selector may also be created using user interfaces.

Figure 11:
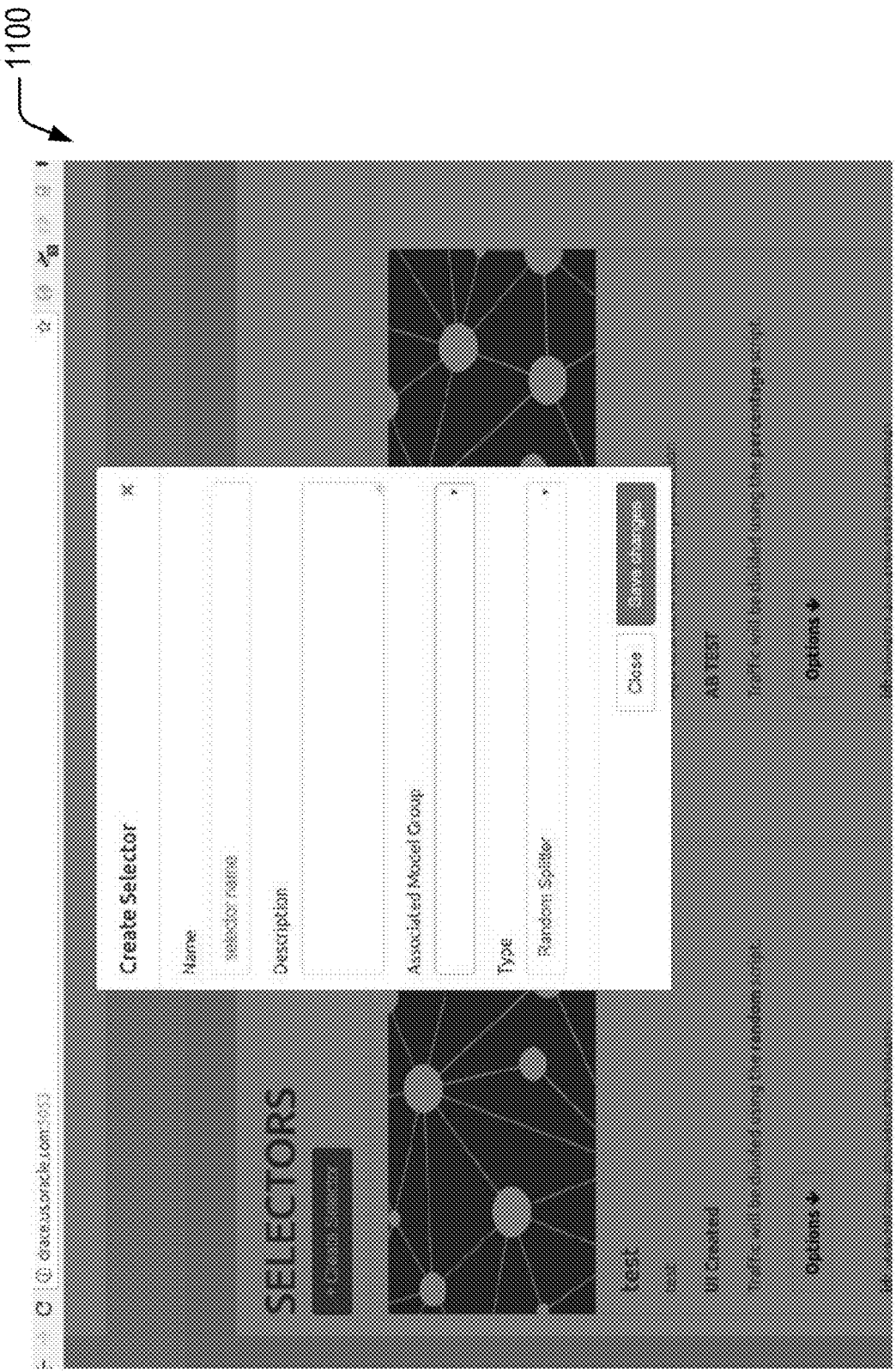
FIG. 11 illustrates an example user interface for associating a selector with a model group on an example machine learning platform according to certain embodiments.

After the model is associated with a model group (e.g., in a container), the model group may be associated with a selector (e.g., a splitter) that can be created using a user interface. FIG. 11 illustrates an example user interface for associating a selector with a model group on an example machine learning platform according to certain embodiments. The selector can be used to score a set of records against a model to evaluate how it performs.

Figure 12:
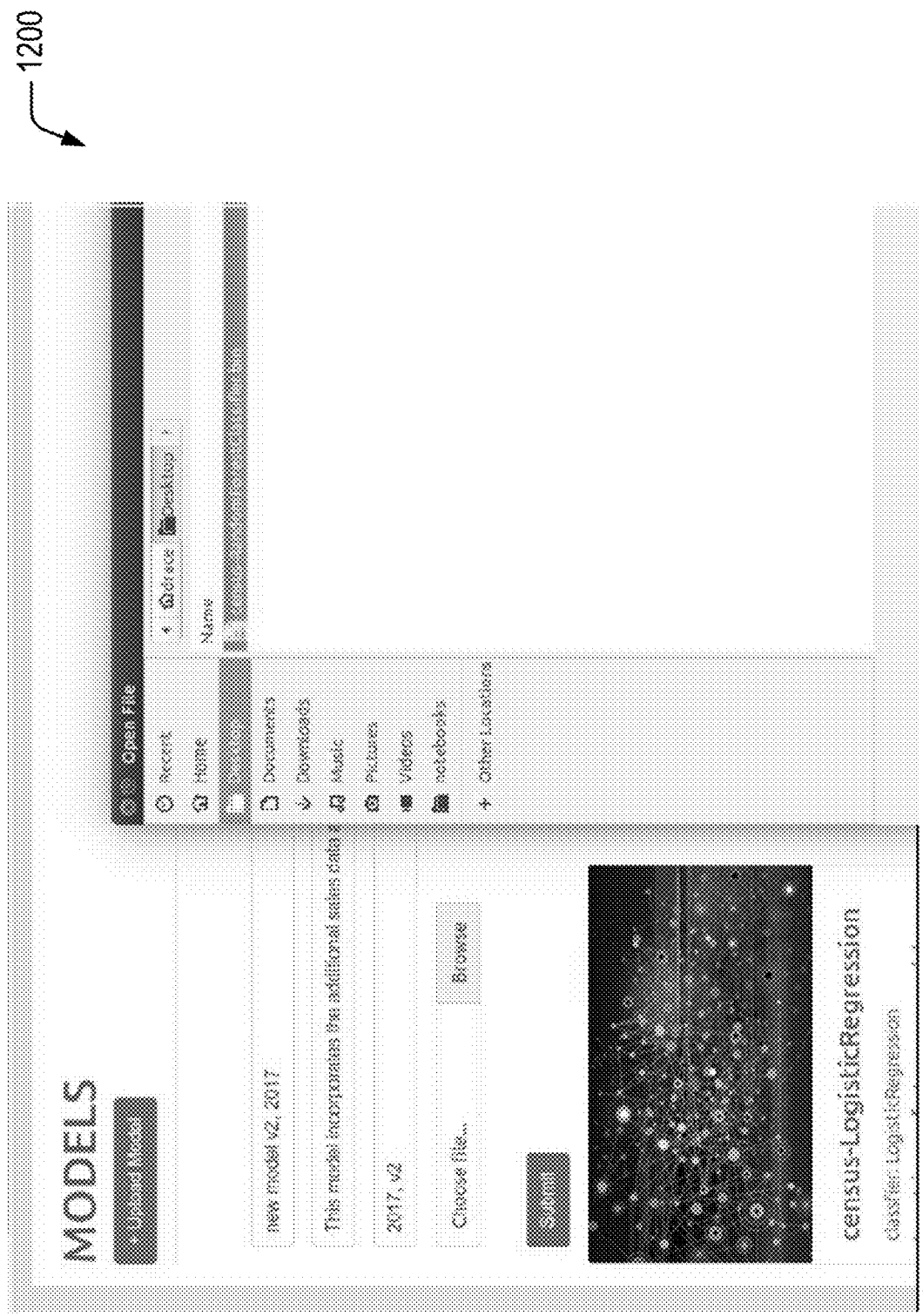
FIG. 12 illustrates an example user interface for uploading a new version of a model to an example machine learning platform, according to certain embodiments.

In some cases, the developer may have subsequently come up with what is believed to be a better model. But the company's policy may be to treat these models as software that should be subject to different types of testing. The developer may save the new model to a file system and upload it to the platform. FIG. 12 illustrates an example user interface for uploading a new version of a model to an example machine learning platform according to certain embodiments. Again, the developer may choose to do this from the user interface or using code.

Figure 13:
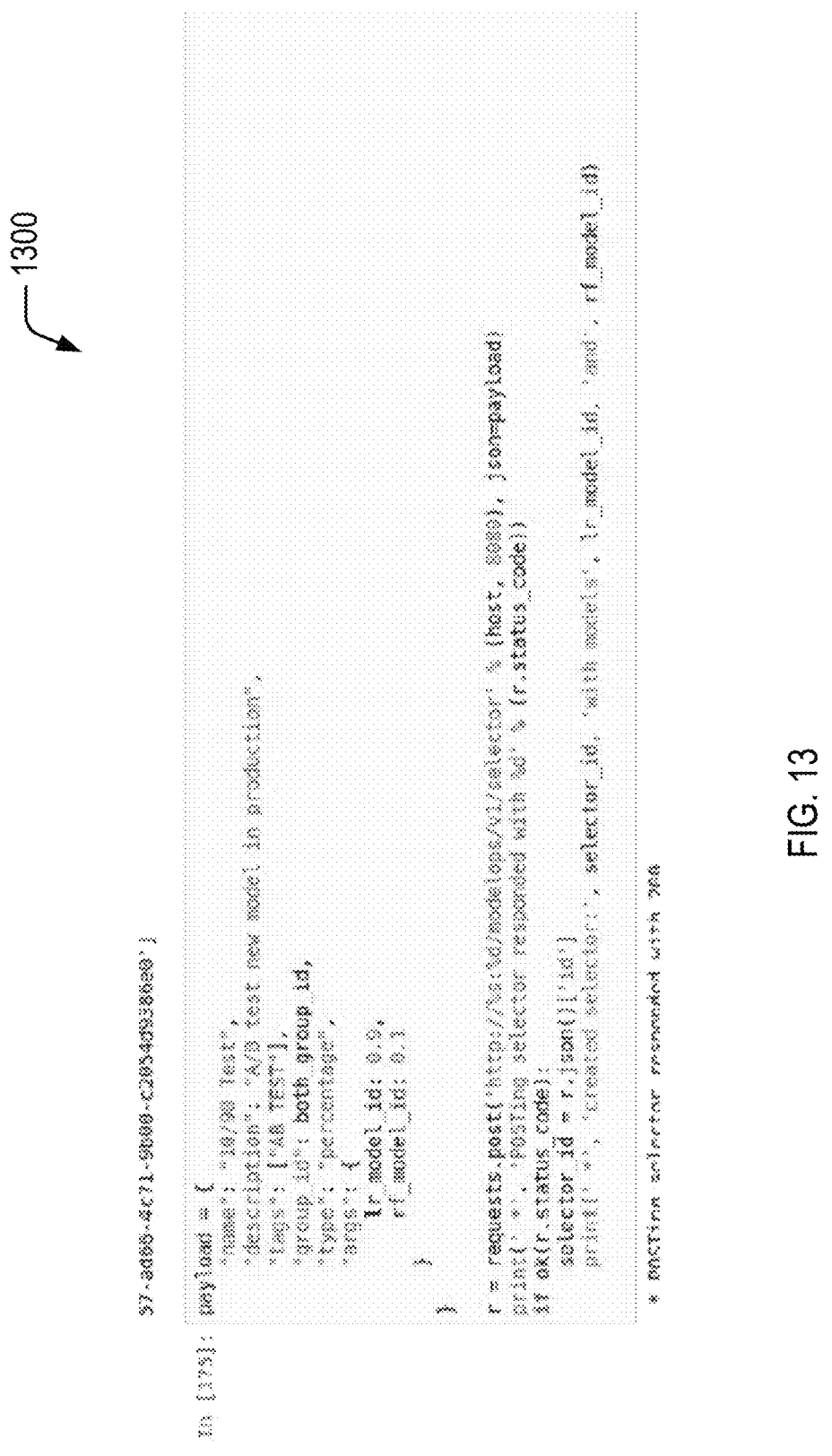

In some embodiments, a selector may be turned into an A/B testing tool. FIG. 13 illustrates example code for setting up an A/B test using a selector (e.g., a splitter) according to certain embodiments. For example, as shown in FIG. 13, the splitter can be updated to a "percentage" type, and 90% of the model scoring traffic may be assigned to an existing (old) model and 10% of the model scoring traffic may be assigned to the new model.

Figure 14:
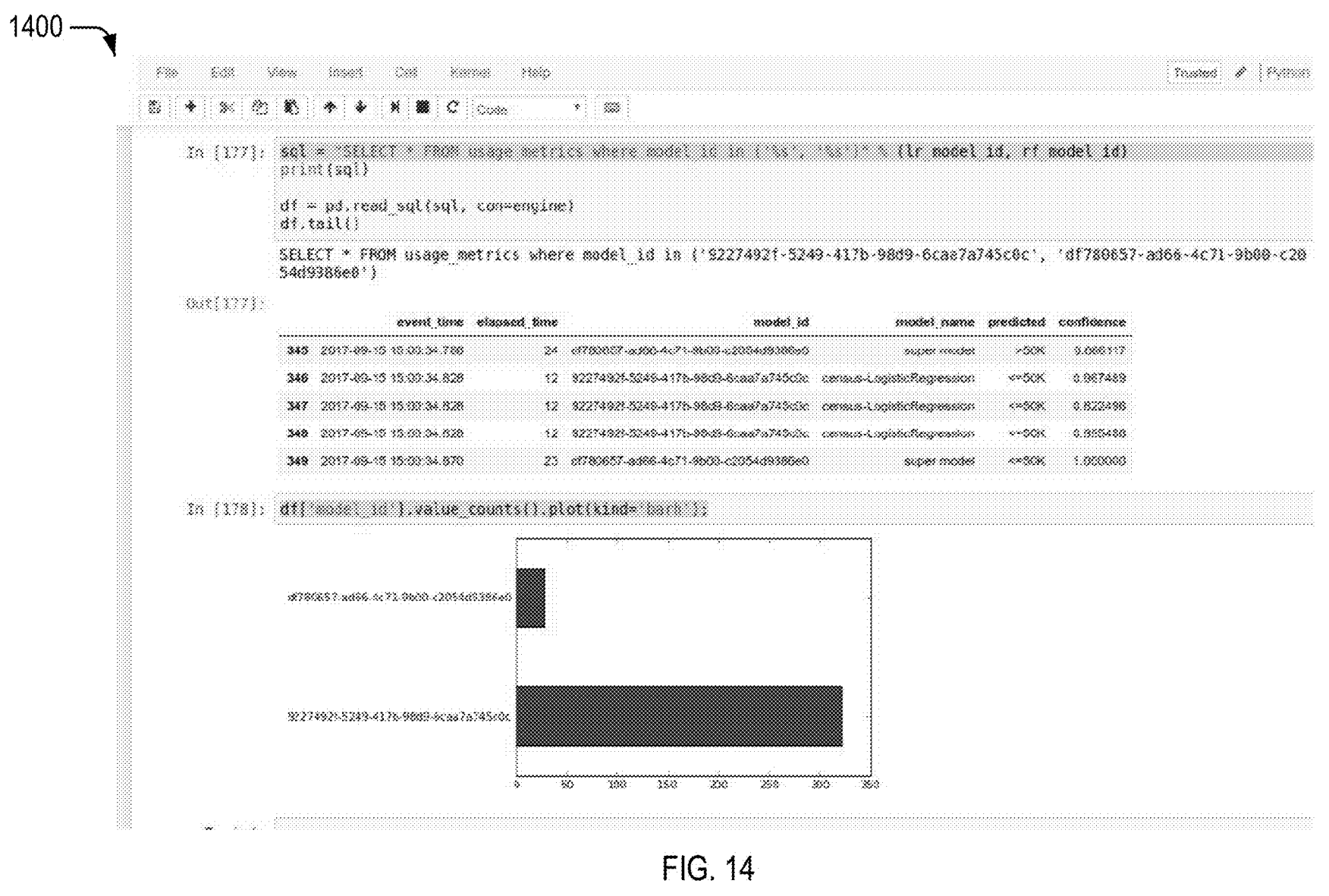

Using the selector, the developer may be able to either experiment live with the model in production with limited traffic and monitor how the model performs or use evaluation datasets to test the model before testing it with live data. The developer can confirm that the traffic is getting split as expected using the ML platform. FIG. 14 illustrates example traffic splitting during an A/B test according to certain embodiments. The selector (e.g., splitter) may be used for, for example, random load balancing, AB testing where traffic percentages can be controlled per model, or sophisticated custom selection where much more sophisticated operations can be performed. The selector can be used to ensemble models, to partition models, to develop rule-based models, or to train a selection model.

The infrastructure described above can be implemented in various different environments including a cloud environment (could be various types of clouds including private, public, and hybrid cloud environments), on-premises environment, a hybrid environment, and the like.

Figure 15:
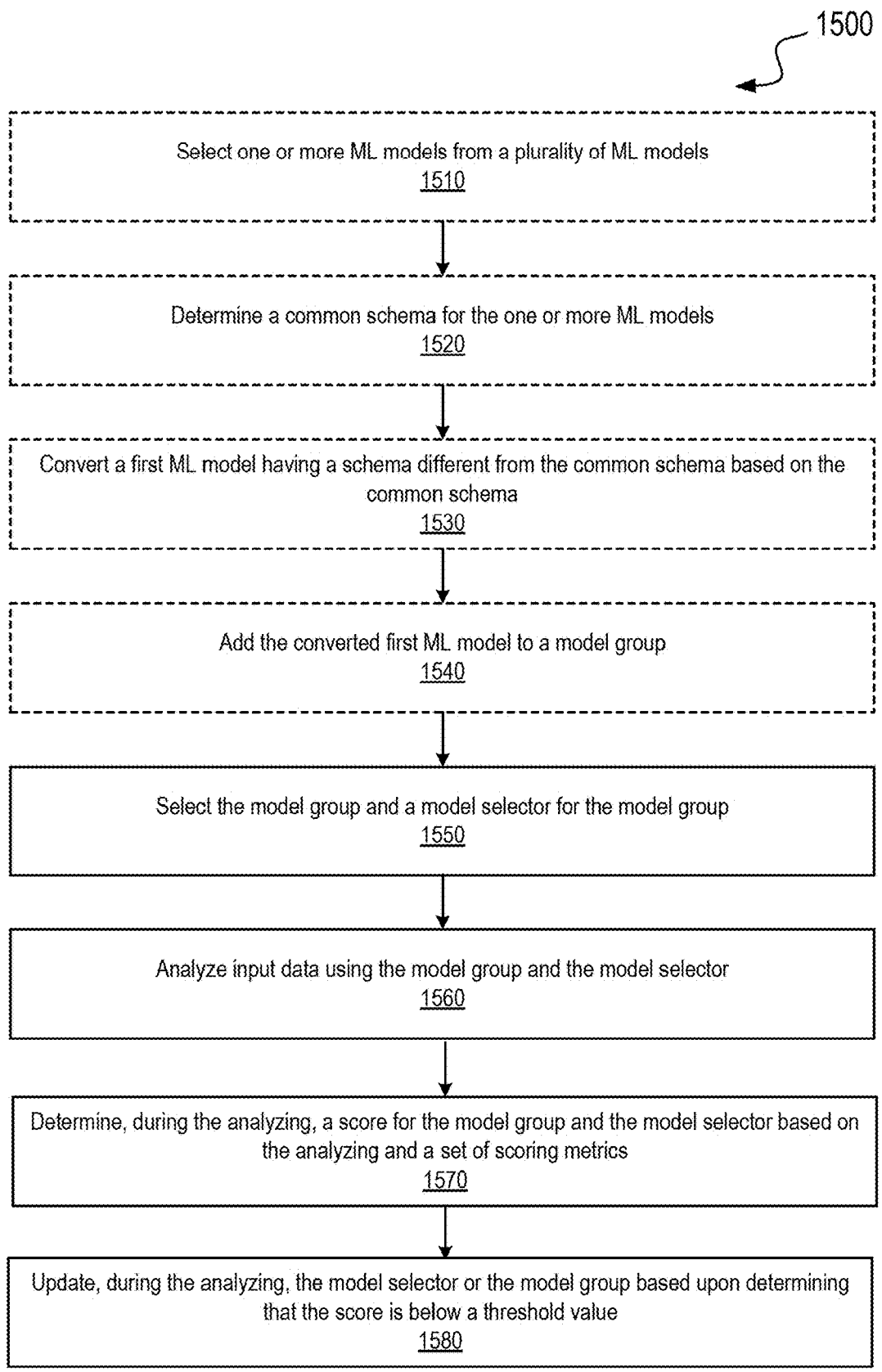
FIG. 15 is a flowchart illustrating an example of processing for dynamically selecting machine learning models in a production environment using a trainable model selector on a machine learning platform according to certain embodiments.

FIG. 15 is a flowchart 1500 illustrating an example of processing for dynamically selecting machine learning models in a production environment using a trainable model selector on a machine learning platform according to certain embodiments. The processing illustrated in FIG. 15 may be used to determine an optimized model selection strategy that may be a function of input data, scoring metrics (e.g., metrics to determine how well a strategy is performing), and historical states (e.g., prior strategies). The processing depicted in FIG. 15 may be performed by a machine learning platform described above. The processing depicted in FIG. 15 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 15 and described below is intended to be illustrative and non-limiting. Although FIG. 15 depicts the various processing steps occurring in a particular sequence or order, this is not intended to be limiting. In certain alternative embodiments, the steps may be performed in some different order or some steps may also be performed in parallel.

Optionally, at 1510, a computer system implementing a ML platform may receive a plurality of ML models, and select one or more ML models from the plurality of ML models. The plurality of ML models may include models generated externally and imported to the ML platform. The plurality of ML models may also include models generated or retrained internally on the ML platform. Thus, the one or more ML models may include different versions of a machine learning model.

Optionally, at 1520, the computer system may determine a common schema for the one or more ML models. As described above, determining the common schema for the one or more ML models may include determining the common schema based on a union of schemas for the one or more ML models, adding one of two congruent features in two respective schemas for two ML models to the common schema, or dropping a feature in a schema for a second ML model based on determining that the feature has an importance level below a second threshold value.

Optionally, at 1530, the computer system may convert a first ML model having a schema different from the common schema based on the common schema. For example, if the schema of the first ML model is congruent to the common schema of the model group, the datatype in the first ML model may be converted based on the datatype in the common schema. Two schemas are congruent if all feature vectors and datatypes of the feature vectors for the two models match or if the datatype of a feature in one model can be adapted to the datatype of a corresponding feature in another model. In some cases, a feature in the schema for the first ML model may be dropped based on determining that the feature has an importance level below a second threshold value.

Optionally, at 1540, the computer system may add the converted first ML model to a model group. In some embodiments, a common schema may first be defined for a model group and models matching the common schema or congruent to the common schema can be added to the group, for example, dynamically. Thus, the ML models in the model group may have a common ML model schema In some embodiments, the first ML model may not be converted before being stored and a model converter may be used to convert the stored first ML model when the first ML model is to be used.

At 1550, the computer system may select the model group and a model selector for the model group. The model group may include one or more machine learning models, where each ML model in the model group may be configured to perform a same function, such as classifying end user intents. The model selector may be configured to dynamically select, based on a set of rules or a trainable selection model, at least one ML model from the model group for data analysis. The set of rules may include a rule for selecting the at least one model based on attributes of the input data. In some embodiments, the model selector may be configured to determine a scheme for using the selected at least one ML model to analyze the input data. For example, the scheme for using the selected at least one ML model to analyze the input data may include analyzing a same portion of the input data by each of the selected at least one ML model, and selecting, from results of analyzing the same portion of the input data by the selected at least one ML model, a most common result as a result for the portion of the input data.

At 1560, the computer system may use the model group and the model selector to analyze input data. For example, the computer system may analyze a first portion of the input data using a first ML model in the model group, analyzing a second portion of the input data using a second ML model in the model group, and/or analyzing a third portion of the input data using a third ML model in the model group. In some embodiments, each of the selected at least one ML model may analyze a same portion of the input data, and a most common result from the results of analyzing the same portion of the input data by the selected at least one ML model may be used as a result for the portion of the input data. In some cases, the input data may include real-time input data from a production environment, and may include contextual data of the production environment.

At 1570, the computer system may determine, during the analyzing of input data (e.g., in the production environment), a score for the model group and the model selector based on the analyzing and a set of scoring metrics. The set of scoring metrics may include some business goals or key performance indicators, such as how long customers stay on a website or how often customers visiting a website purchase an item or service at the end. The scoring may be for a specific model, a group of models (which may be referred to as a model group), a selector that selects models from a model group, or a combination of the model group and the selector.

At 1580, the computer system may update, during the analyzing, the model selector or the model group based upon determining that the score is below a threshold value. Updating the model selector may include adding a new rule to the set of rules, revising a rule in the set of rules, or revising the trainable selection model. Updating the model group may include retraining a first ML model in the model group based on the analyzing and the score, and adding the retrained first ML model to the model group.

Figure 16:
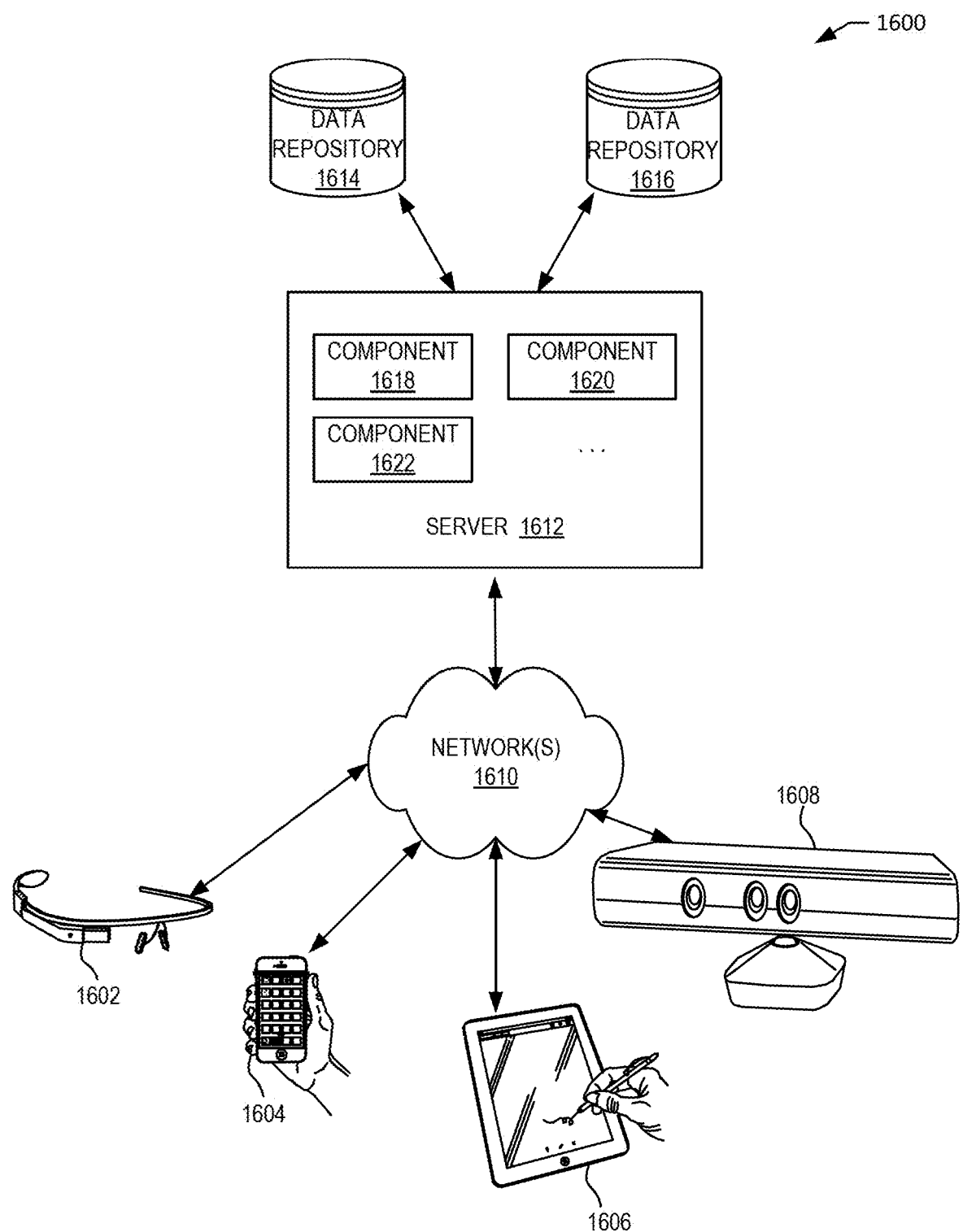
FIG. 16 depicts a simplified diagram of a distributed system for implementing some embodiments.

FIG. 16 depicts a simplified diagram of a distributed system 1600. In the illustrated example, distributed system 1600 includes one or more client computing devices 1602, 1604, 1606, and 1608, coupled to a server 1612 via one or more communication networks 1610. Clients computing devices 1602, 1604, 1606, and 1608 may be configured to execute one or more applications.

In various examples, server 1612 may be adapted to run one or more services or software applications that enable one or more embodiments described in this disclosure. In certain examples, server 1612 may also provide other services or software applications that may include non-virtual and virtual environments. In some examples, these services may be offered as web-based or cloud services, such as under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in FIG. 16, server 1612 may include one or more components 1618, 1620 and 1622 that implement the functions performed by server 1612. These components may include software components that may be executed by one or more processors, hardware components, or combinations thereof. It should be appreciated that various different system configurations are possible, which may be different from distributed system 1600. The example shown in FIG. 16 is thus one example of a distributed system for implementing an example system and is not intended to be limiting.

Users may use client computing devices 1602, 1604, 1606, and/or 1608 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 16 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1612 may include one or more virtual machines running virtual operating systems, or other computing architectures involving virtualization such as one or more flexible pools of logical storage devices that may be virtualized to maintain virtual storage devices for the server. In various examples, server 1612 may be adapted to run one or more services or software applications that provide the functionality described in the foregoing disclosure.

The computing systems in server 1612 may run one or more operating systems including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more data repositories 1614, 1616. These data repositories may be used to store data and other information in certain examples. For example, one or more of the data repositories 1614, 1616 may be used to store information such as information related to storage virtual machines, information mapping application IDs to application to selected storage virtual machines, and other information used by server 1612 when performing authentication functions. Data repositories 1614, 1616 may reside in a variety of locations. For example, a data repository used by server 1612 may be local to server 1612 or may be remote from server 1612 and in communication with server 1612 via a network-based or dedicated connection. Data repositories 1614, 1616 may be of different types. In certain examples, a data repository used by server 1612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1614, 1616 may also be used by applications to store application data. The data repositories used by applications may be of different types such as, for example, a key-value store repository, an object store repository, or a general storage repository supported by a file system.

Figure 17:
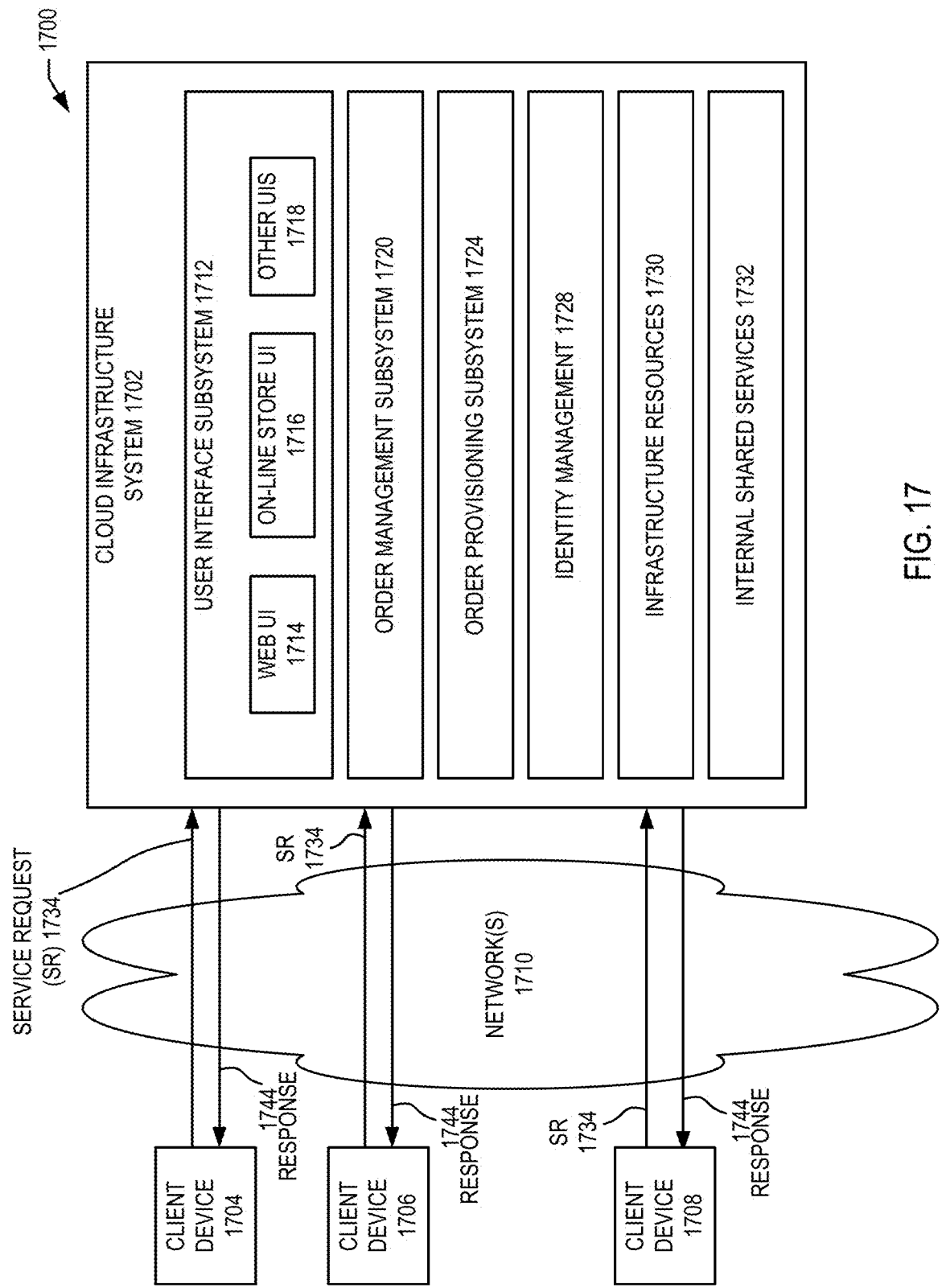
FIG. 17 is a simplified block diagram of an example of a cloud-based system environment in which various storage-related services may be offered as cloud services in accordance with certain embodiments.

In certain examples, the functionalities described in this disclosure may be offered as services via a cloud environment. FIG. 17 is a simplified block diagram of a cloud-based system environment in which various services may be offered as cloud services in accordance with certain examples. In the example depicted in FIG. 17, cloud infrastructure system 1702 may provide one or more cloud services that may be requested by users using one or more client computing devices 1704, 1706, and 1708. Cloud infrastructure system 1702 may comprise one or more computers and/or servers that may include those described above for server 1612. The computers in cloud infrastructure system 1702 may be organized as general purpose computers, specialized server computers, server farms, server clusters, or any other appropriate arrangement and/or combination.

Network(s) 1710 may facilitate communication and exchange of data between clients 1704, 1706, and 1708 and cloud infrastructure system 1702. Network(s) 1710 may include one or more networks. The networks may be of the same or different types. Network(s) 1710 may support one or more communication protocols, including wired and/or wireless protocols, for facilitating the communications.

The example depicted in FIG. 17 is only one example of a cloud infrastructure system and is not intended to be limiting. It should be appreciated that, in some other examples, cloud infrastructure system 1702 may have more or fewer components than those depicted in FIG. 17, may combine two or more components, or may have a different configuration or arrangement of components. For example, although FIG. 17 depicts three client computing devices, any number of client computing devices may be supported in alternative examples.

The term cloud service is generally used to refer to a service that is made available to users on demand and via a communication network such as the Internet by systems (e.g., cloud infrastructure system 1702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 1702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1702. Cloud infrastructure system 1702 then performs processing to provide the services requested in the customer's subscription order. For example, a user may request the cloud infrastructure system to register an application, as described above, and provide services to the application per the application's specified requirements. Cloud infrastructure system 1702 may be configured to provide one or even multiple cloud services.

Cloud infrastructure system 1702 may provide the cloud services via different deployment models. In a public cloud model, cloud infrastructure system 1702 may be owned by a third party cloud services provider and the cloud services are offered to any general public customer, where the customer may be an individual or an enterprise. In certain other examples, under a private cloud model, cloud infrastructure system 1702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1702 and the services provided may be shared by several organizations in a related community. Various other models such as hybrids of the above mentioned models may also be used.

Client computing devices 1704, 1706, and 1708 may be of different types (such as client computing devices 1602, 1604, 1606, and 1608 depicted in FIG. 16) and may be capable of operating one or more client applications. A user may use a client device to interact with cloud infrastructure system 1702, such as to request a service provided by cloud infrastructure system 1702. For example, a user may use a client device to request an authentication-related service described in this disclosure.

In some examples, the processing performed by cloud infrastructure system 1702 for providing services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1702 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 17, cloud infrastructure system 1702 may include infrastructure resources 1730 that are utilized for facilitating the provision of various cloud services offered by cloud infrastructure system 1702. Infrastructure resources 1730 may include, for example, processing resources, storage or memory resources, networking resources, and the like. In certain examples, the storage virtual machines that are available for servicing storage requested from applications may be part of cloud infrastructure system 1702. In other examples, the storage virtual machines may be part of different systems.

In certain examples, to facilitate efficient provisioning of these resources for supporting the various cloud services provided by cloud infrastructure system 1702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1702 may itself internally use services 1732 that are shared by different components of cloud infrastructure system 1702 and which facilitate the provisioning of services by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1702 may comprise multiple subsystems. These subsystems may be implemented in software, or hardware, or combinations thereof. As depicted in FIG. 17, the subsystems may include a user interface subsystem 1712 that enables users or customers of cloud infrastructure system 1702 to interact with cloud infrastructure system 1702. User interface subsystem 1712 may include various different interfaces such as a web interface 1714, an online store interface 1716 where cloud services provided by cloud infrastructure system 1702 are advertised and are purchasable by a consumer, and other interfaces 1718. For example, a customer may, using a client device, request (service request 1734) one or more services provided by cloud infrastructure system 1702 using one or more of interfaces 1714, 1716, and 1718. For example, a customer may access the online store, browse cloud services offered by cloud infrastructure system 1702, and place a subscription order for one or more services offered by cloud infrastructure system 1702 that the customer wishes to subscribe to. The service request may include information identifying the customer and one or more services that the customer desires to subscribe to. For example, a customer may place a subscription order for a service offered by cloud infrastructure system 1702. As part of the order, the customer may provide information identifying an application for which the service is to be provided and the one or more credentials for the application.

In certain examples, such as the example depicted in FIG. 17, cloud infrastructure system 1702 may comprise an order management subsystem (OMS) 1720 that is configured to process the new order. As part of this processing, OMS 1720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1720 may then invoke the order provisioning subsystem (OPS) 1724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1702 as part of the provisioning process. Cloud infrastructure system 1702 may generate an application ID and select a storage virtual machine for an application from among storage virtual machines provided by cloud infrastructure system 1702 itself or from storage virtual machines provided by other systems other than cloud infrastructure system 1702.

Cloud infrastructure system 1702 may send a response or notification 1744 to the requesting customer to indicate when the requested service is now ready for use. In some instances, information (e.g., a link) may be sent to the customer that enables the customer to start using and availing the benefits of the requested services. In certain examples, for a customer requesting the service, the response may include an application ID generated by cloud infrastructure system 1702 and information identifying a virtual machine selected by cloud infrastructure system 1702 for an application corresponding to the application ID.

Cloud infrastructure system 1702 may provide services to multiple customers. For each customer, cloud infrastructure system 1702 is responsible for managing information related to one or more subscription orders received from the customer, maintaining customer data related to the orders, and providing the requested services to the customer. Cloud infrastructure system 1702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1702 may provide services to multiple customers in parallel. Cloud infrastructure system 1702 may store information for these customers, including possibly proprietary information. In certain examples, cloud infrastructure system 1702 comprises an identity management subsystem (IMS) 1728 that is configured to manage customer information and provide the separation of the managed information such that information related to one customer is not accessible by another customer. IMS 1728 may be configured to provide various security-related services such as identity services, such as information access management, authentication and authorization services, services for managing customer identities and roles and related capabilities, and the like.

Figure 18:
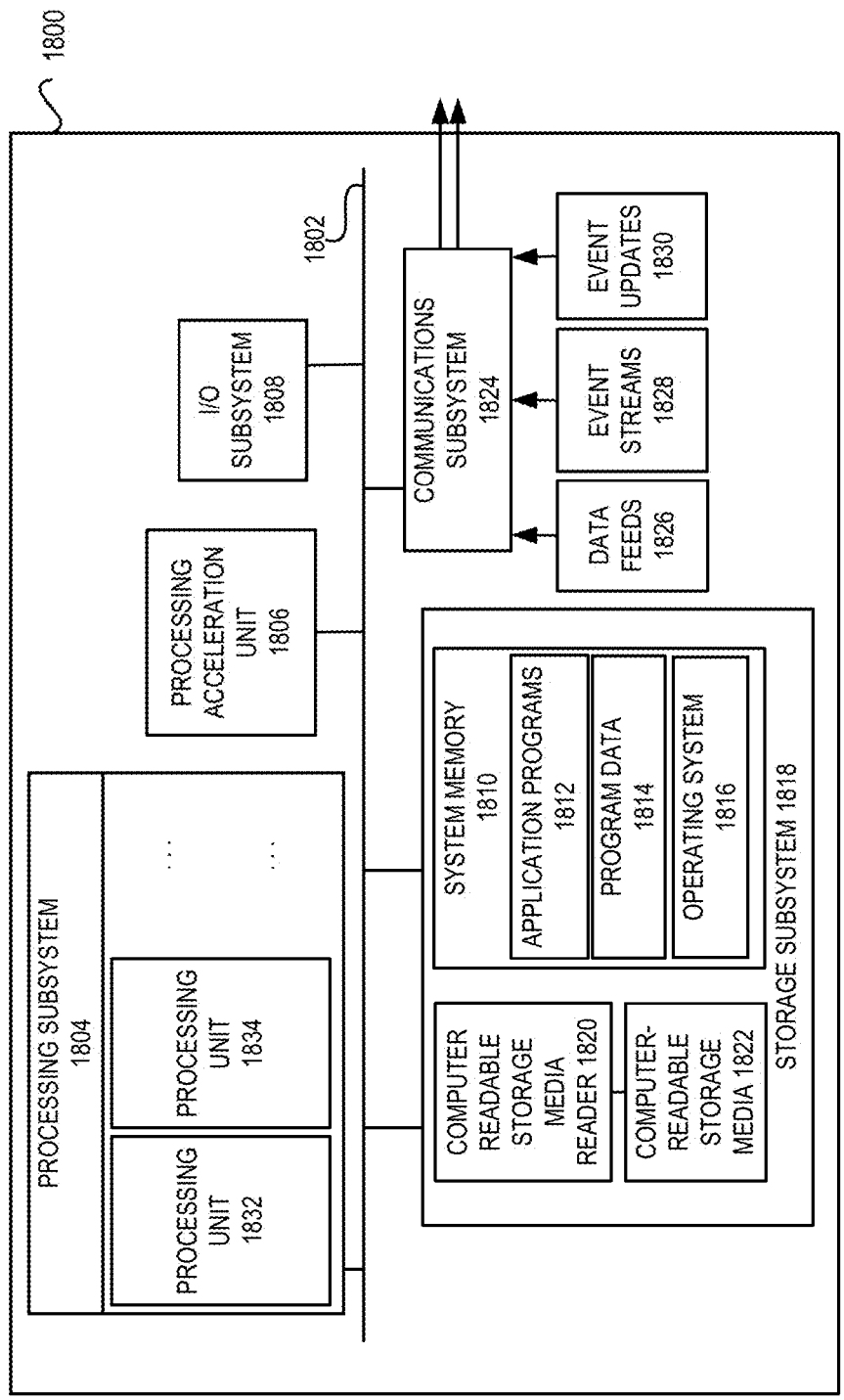
FIG. 18 illustrates an example of a computer system that may be used to implement certain embodiments.

FIG. 18 illustrates an example of computer system 1800. In some examples, computer system 1800 may be used to implement any of the application system, access management system, systems within a data center, and various servers and computer systems described above. As shown in FIG. 18, computer system 1800 includes various subsystems including a processing subsystem 1804 that communicates with a number of other subsystems via a bus subsystem 1802. These other subsystems may include a processing acceleration unit 1806, an I/O subsystem 1808, a storage subsystem 1818, and a communications subsystem 1824. Storage subsystem 1818 may include non-transitory computer-readable storage media including storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative examples of the bus subsystem may utilize multiple buses. Bus subsystem 1802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1804 controls the operation of computer system 1800 and may comprise one or more processors, application specific integrated circuits (ASICs), or field programmable gate arrays (FPGAs). The processors may include be single core or multicore processors. The processing resources of computer system 1800 may be organized into one or more processing units 1832, 1834, etc. A processing unit may include one or more processors, one or more cores from the same or different processors, a combination of cores and processors, or other combinations of cores and processors. In some examples, processing subsystem 1804 may include one or more special purpose co-processors such as graphics processors, digital signal processors (DSPs), or the like. In some examples, some or all of the processing units of processing subsystem 1804 may be implemented using customized circuits, such as application specific integrated circuits (ASICs), or field programmable gate arrays (FPGAs).

In some examples, the processing units in processing subsystem 1804 may execute instructions stored in system memory 1810 or on computer readable storage media 1822. In various examples, the processing units may execute a variety of programs or code instructions and may maintain multiple concurrently executing programs or processes. At any given time, some or all of the program code to be executed may be resident in system memory 1810 and/or on computer-readable storage media 1822 including potentially on one or more storage devices. Through suitable programming, processing subsystem 1804 may provide various functionalities described above. In instances where computer system 1800 is executing one or more virtual machines, one or more processing units may be allocated to each virtual machine.

In certain examples, a processing acceleration unit 1806 may optionally be provided for performing customized processing or for off-loading some of the processing performed by processing subsystem 1804 so as to accelerate the overall processing performed by computer system 1800.

I/O subsystem 1808 may include devices and mechanisms for inputting information to computer system 1800 and/or for outputting information from or via computer system 1800. In general, use of the term input device is intended to include all possible types of devices and mechanisms for inputting information to computer system 1800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1818 provides a repository or data store for storing information and data that is used by computer system 1800. Storage subsystem 1818 provides a tangible non-transitory computer-readable storage medium for storing the basic programming and data constructs that provide the functionality of some examples. Storage subsystem 1818 may store software (e.g., programs, code modules, instructions) that when executed by processing subsystem 1804 provides the functionality described above. The software may be executed by one or more processing units of processing subsystem 1804. Storage subsystem 1818 may also provide authentication in accordance with the teachings of this disclosure.

Storage subsystem 1818 may include one or more non-transitory memory devices, including volatile and non-volatile memory devices. As shown in FIG. 18, storage subsystem 1818 includes a system memory 1810 and a computer-readable storage media 1822. System memory 1810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1800, such as during start-up, may typically be stored in the ROM. The RAM typically contains data and/or program modules that are presently being operated and executed by processing subsystem 1804. In some implementations, system memory 1810 may include multiple different types of memory, such as static random access memory (SRAM), dynamic random access memory (DRAM), and the like.

By way of example, and not limitation, as depicted in FIG. 18, system memory 1810 may load application programs 1812 that are being executed, which may include various applications such as Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1822 may store programming and data constructs that provide the functionality of some examples. Computer-readable media 1822 may provide storage of computer-readable instructions, data structures, program modules, and other data for computer system 1800. Software (programs, code modules, instructions) that, when executed by processing subsystem 1804 provides the functionality described above, may be stored in storage subsystem 1818. By way of example, computer-readable storage media 1822 may include non-volatile memory such as a hard disk drive, a magnetic disk drive, an optical disk drive such as a CD ROM, DVD, a Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1818 may also include a computer-readable storage media reader 1820 that may further be connected to computer-readable storage media 1822. Reader 1820 may receive and be configured to read data from a memory device such as a disk, a flash drive, etc.

In certain examples, computer system 1800 may support virtualization technologies, including but not limited to virtualization of processing and memory resources. For example, computer system 1800 may provide support for executing one or more virtual machines. In certain examples, computer system 1800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1800. Accordingly, multiple operating systems may potentially be run concurrently by computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to establish a communication channel to one or more client devices via the Internet for receiving and sending information from and to the client devices.

Communication subsystem 1824 may support both wired and/or wireless communication protocols. In certain examples, communications subsystem 1824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1824 may provide wired network connectivity (e.g., Ethernet) in addition to or instead of a wireless interface.

Communication subsystem 1824 may receive and transmit data in various forms. In some examples, in addition to other forms, communications subsystem 1824 may receive input communications in the form of structured and/or unstructured data feeds 1826, event streams 1828, event updates 1830, and the like. For example, communications subsystem 1824 may be configured to receive (or send) data feeds 1826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1824 may be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1824 may also be configured to communicate data from computer system 1800 to other computer systems or networks. The data may be communicated in various different forms such as structured and/or unstructured data feeds 1826, event streams 1828, event updates 1830, and the like to one or more databases that may be in communication with one or more streaming data source computers coupled to computer system 1800.

Computer system 1800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1800 depicted in FIG. 18 is intended only as a specific example. Many other configurations having more or fewer components than the system depicted in FIG. 18 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details.

For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising, by a computing system:
    selecting one or more machine learning (ML) models from a plurality of ML models;
    determining a common schema for a model group that includes the one or more ML models, wherein the common schema indicates names and datatypes of features of the one or more ML models and each ML model in the model group is configured to perform a same function;
    converting a first ML model having a schema different from the common schema to a converted first ML model having the common schema;
    adding the converted first ML model to the model group;
    dynamically selecting, by a model selector for the model group and based on a set of rules or a trainable selection model, at least one ML model from the model group for data analysis;
    analyzing input data using the model group including the at least one dynamically selected ML model, and the model selector;
    determining, during the analyzing, a score for the model group including the at least one dynamically selected ML model, and the model selector based on the analyzing and a set of scoring metrics; and
    updating, during the analyzing, the model selector or the model group based upon determining that the score is below a threshold value.

2. The method of claim 1, wherein a feature in the first ML model has a same name as and a different datatype than a corresponding feature in the common schema.

3. The method of claim 1, wherein the one or more ML models in the model group include different versions of a machine learning model.

4. The method of claim 1, wherein the set of scoring metrics comprises a business goal.

5. The method of claim 1, wherein the set of rules includes a rule for selecting the at least one ML model based on attributes of the input data.

6. The method of claim 1, wherein updating the model selector comprises:
    adding a new rule to the set of rules;
    revising a rule in the set of rules; or
    revising the trainable selection model.

7. The method of claim 1, wherein updating the model group comprises:
    retraining the first ML model in the model group based on the analyzing and the score; and
    adding the retrained first ML model to the model group.

8. The method of claim 1, wherein the input data includes real-time input data from a production environment.

9. The method of claim 8, wherein the input data includes contextual data of the production environment.

10. The method of claim 1, wherein analyzing the input data using the model group and the model selector comprises:
    analyzing a first portion of the input data using the first ML model in the model group; and
    analyzing a second portion of the input data using a second ML model in the model group.

11. The method of claim 10, wherein analyzing the input data using the model group and the model selector further comprises analyzing a third portion of the input data using a third ML model in the model group.

12. The method of claim 1, wherein the model selector is further configured to determine a scheme for using the selected at least one ML model to analyze the input data.

13. The method of claim 12, wherein the scheme for using the selected at least one ML model to analyze the input data comprises:
    for each of the selected at least one ML model, analyzing a same portion of the input data by the ML model to obtain a corresponding result; and selecting, as a result for the portion of the input data, a most common result from the corresponding results.

14. The method of claim 1, further comprising:
reporting usage of the one or more ML models in the model group for the analyzing.

15. The method of claim 1,
wherein converting the first ML model comprises converting a datatype of a feature in the first ML model.

16. The method of claim 1, wherein determining the common schema for the one or more ML models comprises:
adding one of two congruent features in two respective schemas for two ML models to the common schema; or
dropping a feature in a schema for a second ML model based on determining that the feature has an importance level below a second threshold value.

17. A non-transitory computer readable medium storing a plurality of instructions executable by one or more processors, wherein the plurality of instructions, when executed by the one or more processors, causes the one or more processors to perform processing comprising:
selecting one or more machine learning (ML) models from a plurality of ML models;
determining a common schema for a model group that includes the one or more ML models, wherein the common schema indicates names and datatypes of features of the one or more ML models and each ML model in the model group is configured to perform a same function;
converting a first ML model having a schema different from the common schema to a converted first ML model having the common schema;
adding the converted first ML model to the model group;
dynamically selecting, by a model selector for the model group and based on a set of rules or a trainable selection model, at least one ML model from the model group for data analysis;
analyzing input data using the model group including the at least one dynamically selected ML model, and the model selector;
determining, during the analyzing, a score for the model group including the at least one dynamically selected ML model, and the model selector based on the analyzing and a set of scoring metrics; and
updating, during the analyzing, the model selector or the model group based upon determining that the score is below a threshold value.

18. The non-transitory computer readable medium of claim 17, wherein determining the common schema for the model group comprises:

determining the common schema based on a union of schemas for the one or more ML models;
adding one of two congruent features in two respective schemas for two ML models to the common schema; or
dropping a feature in a schema for a second ML model based on determining that the feature has an importance level below a second threshold value.

19. A system comprising:
one or more processors; and
a memory coupled to the one or more processors, the memory storing instructions, which, when executed by the one or more processors, cause the system to:
select one or more machine learning (ML) models from a plurality of ML models;
determine a common schema for a model group that includes the one or more ML models, wherein the common schema indicates names and datatypes of features of the one or more ML models and each ML model in the model group is configured to perform a same function;
convert a first ML model having a schema different from the common schema to a converted first ML model having the common schema;
add the converted first ML model to the model group;
dynamically select, by a model selector for the model group and based on a set of rules or a trainable selection model, at least one ML model from the model group for data analysis;
analyze input data using the model group including the at least one dynamically selected ML model, and the model selector;
determine, during the analyzing, a score for the model group including the at least one dynamically selected ML model, and the model selector based on the analyzing and a set of scoring metrics; and
update, during the analyzing, the model selector or the model group based upon determining that the score is below a threshold value.

20. The method according to claim 1, wherein the first ML model having the schema different from the common schema is converted when the schema of the first ML model is congruent to the schema of the common schema of the model group, and
wherein the model selector is a trainable model selector based on a machine learning model or based on a set of rules.

* * * * *

UNITED STATES PATENT AND TRADEMARK OFFICE
CERTIFICATE OF CORRECTION

PATENT NO. : 11,720,813 B2
APPLICATION NO. : 16/147255
DATED : August 8, 2023
INVENTOR(S) : Babu et al.

It is certified that error appears in the above-identified patent and that said Letters Patent is hereby corrected as shown below:

In the Specification

In Column 10, Line 31, delete "M1" and insert -- Ml --, therefor.

In Column 13, Lines 23-24, delete "Apendix" and insert -- Appendix --, therefor.

In Column 13, Line 31, delete "certatin" and insert -- certain --, therefor.

In Column 13, Line 36, delete "generete" and insert -- generate --, therefor.

In Column 13, Lines 39-40, delete "the the" and insert -- the --, therefor.

In Column 24, Line 36, delete "Internet" and insert -- Internetwork --, therefor.

In Column 31, Line 28, delete "Glass®." and insert -- Glass®). -- , therefor.

Signed and Sealed this
Twenty-eighth Day of May, 2024

Katherine Kelly Vidal
*Director of the United States Patent and Trademark Office*